US011451770B2

(12) United States Patent
Viswanathan Iyer et al.

(10) Patent No.: US 11,451,770 B2
(45) Date of Patent: Sep. 20, 2022

(54) SYSTEM AND METHOD FOR VIDEO PERFORMANCE OPTIMIZATIONS DURING A VIDEO CONFERENCE SESSION

(71) Applicant: Dell Products, LP, Round Rock, TX (US)

(72) Inventors: Vivek Viswanathan Iyer, Austin, TX (US); Todd E. Swierk, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 49 days.

(21) Appl. No.: 17/157,586

(22) Filed: Jan. 25, 2021

(65) Prior Publication Data
US 2022/0239898 A1 Jul. 28, 2022

(51) Int. Cl.
*H04N 19/52* (2014.01)
*H04N 19/174* (2014.01)
*H04N 7/15* (2006.01)
*H04N 19/105* (2014.01)
*G06V 20/40* (2022.01)
*G06V 40/20* (2022.01)

(52) U.S. Cl.
CPC .......... *H04N 19/105* (2014.11); *G06V 20/49* (2022.01); *G06V 40/23* (2022.01); *H04N 7/152* (2013.01); *H04N 19/174* (2014.11); *H04N 19/52* (2014.11)

(58) Field of Classification Search
CPC .................................................. H04N 19/105
See application file for complete search history.

(56) References Cited

U.S. PATENT DOCUMENTS

| 8,401,232 B2* | 3/2013 | Fan ........................ G06T 7/215 600/407 |
| 8,436,889 B2* | 5/2013 | Eleftheriadis ...... H04N 21/4316 348/14.09 |

(Continued)

*Primary Examiner* — Irfan Habib
(74) *Attorney, Agent, or Firm* — Prol Intellectual Property Law, PLLC; H. Kenneth Prol

(57) ABSTRACT

An information handling system executing a multimedia multi-user collaboration application (MMCA) may include a memory; a power management unit; a video camera to capture video of a user participating in a video conference session conducted by a processor executing code instructions of the MMCA via a first network link on a network interface device; a time-of-flight (TOF) sensor to provide distance data descriptive of the distance between a user's body and the video camera; the processor configured to execute a video frame user presence detection system to: slice a video frame into a plurality of video frame slices; based on the distance data, create a human object presence (HOP) heat map to assign a probability of the presence of the user's body within each video frame slice of the video frame; the processor configured to select, among the plurality of video frame slices, those video frame slices with an assigned probability of presence of the user's body that exceeds a threshold probability as a HOP video frame slice group where the user's body appears within the video frame; and the network interface device configured to send data defining the HOP video frame slice group to a sink information handling system participating in the video conference session over the network to assist decoding of the video frame at the sink information handling system.

20 Claims, 8 Drawing Sheets

(56) References Cited

U.S. PATENT DOCUMENTS

| | | | |
|---|---|---|---|
| 8,988,491 B2 * | 3/2015 | Yamashita | H04N 7/148 348/14.09 |
| 9,008,320 B2 * | 4/2015 | Sakagami | H04R 3/005 348/14.1 |
| 9,432,625 B2 | 8/2016 | Delegue | |
| 9,736,367 B1 * | 8/2017 | Alam | H04N 7/15 |
| 10,257,522 B2 | 4/2019 | Sato | |
| 10,542,255 B2 | 1/2020 | Alakuijala | |
| 10,554,977 B2 | 2/2020 | Fu | |
| 10,812,804 B2 * | 10/2020 | Park | H04N 19/174 |
| 10,869,062 B2 * | 12/2020 | Egilmez | H04N 19/157 |
| 11,199,886 B1 * | 12/2021 | North | G06F 1/3206 |
| 11,257,511 B1 * | 2/2022 | Peeler | H04R 3/04 |
| 11,310,464 B1 * | 4/2022 | Swierk | H04N 7/142 |
| 2013/0202025 A1 * | 8/2013 | Baron | H04N 21/2385 375/240.02 |
| 2018/0007364 A1 | 1/2018 | Noraz | |
| 2020/0294317 A1 * | 9/2020 | Segal | G06T 19/006 |
| 2020/0329088 A1 * | 10/2020 | Oyman | G06T 9/001 |

* cited by examiner

SYSTEM AND METHOD FOR VIDEO PERFORMANCE OPTIMIZATIONS DURING A VIDEO CONFERENCE SESSION

FIELD OF THE DISCLOSURE

The present disclosure generally relates to multimedia, multi-user collaboration applications, such as videoconferencing applications. The present disclosure more specifically relates to optimizing video performance during execution of a multimedia, multi-user collaboration applications, such as videoconferencing applications.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a video/graphic display device through which a user may conduct a video conference session.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
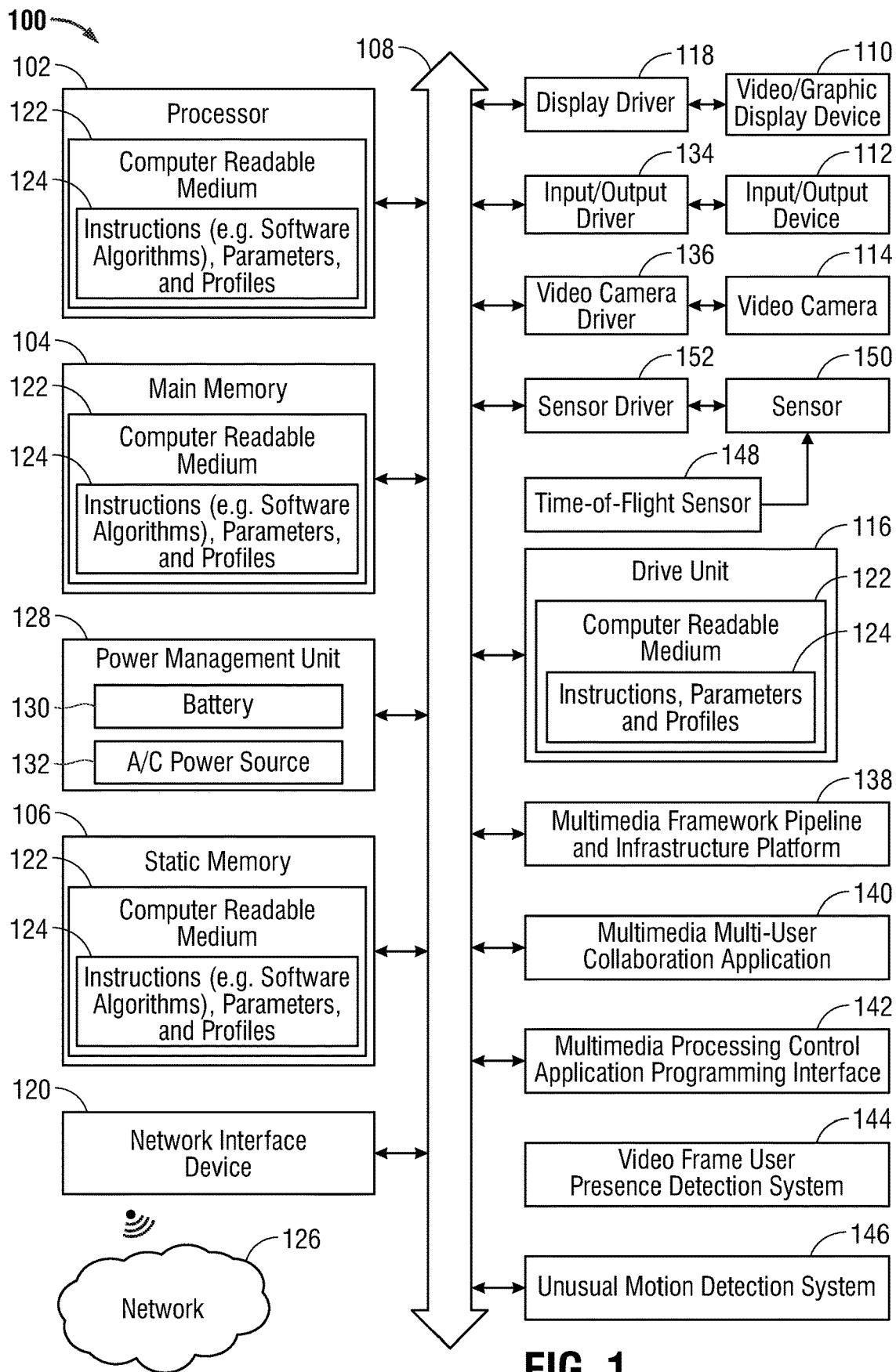
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As working remotely has gained in popularity, so too has the prevalence of multi-employee or multi-business video conferences. Many of these video conferences (also referred to as web-conferences, online meetings, tele-video conferences, or remote conferences) may include a large number of people, sometimes exceeding 50 or 100 participants. In many cases, only one or a handful of meeting participants are actively engaged in the meeting, as presenters, or as active participants in a discussion, for example. However, most existing multimedia multi-user collaboration applications (MMCA) hosting such video conferences perform the same video processing methods on videos of each participant. Such processing may occur both at each individual participant's computing device, and at all other participant's computing devices, after the video of a single participant has been transmitted to the computing devices of all other participants. Further, such processing for MMCA functions of the video conference session can be computationally intensive and burdens processor resources. Thus, the MMCA processing burden depend on the functions of the video conference via the MMCA or the function of other applications operating on an information handling system.

Embodiments of the present disclosure provide for an information handling system that includes a memory, a power management unit and a video camera to capture video of a user participating in a video conference session conducted by the MMCA via a first network link on a network interface device. The information handling system may also include a time-of-flight (TOF) sensor or other distance sensor to provide distance data descriptive of the distance between a user's body and the video camera during the video conferencing session. In an embodiment, as the information handling system receives video frames from the video camera, the processor may execute a video frame user presence detection system to slice a video frame into a plurality of video frame slices and based on the distance data, create a human object presence (HOP) heat map. In this embodiment, the processor may also be configured to assign a probability of the presence of the user's body within each video frame slice of the video frame based on distance data of objects or a user's body appearing in each video frame slice relative to all other slices. The probability assigned to each of the video frame slices provides the processor with the ability to select, among the plurality of video frame slices, those video frame slices with an assigned probability of presence of the user's body that exceeds a threshold probability in order to create a HOP video frame slice group as a set of video frame slices indicating where the user's body appears within the video frame.

By doing so, those video frame slices used to define the HOP video frame slice may be encoded using, for example, a first encoding algorithm that may consume more processing resources, but yields less data loss and a higher quality transfer of this portion of the video frame. For a video conference, the images of the user in the video frames may be more important to have a high-quality image transmitted than background portions of the video frame. In another aspect, those video frame slices that fall outside of the HOP heat map and the HOP video frame slice may be encoded using second encoding algorithm having a lower computational burden than the first encoding algorithm. This reduces the processing resources used to encode a single video frame. This process may be done in preparation for the network interface device to send data defining the HOP heat map and the HOP video frame slice group to a sink information handling system over the network to assist decoding of the video frame at the sink information handling system. In an embodiment, the data defining the HOP heat map and the HOP video frame slice group may be sent to the sink information handling system using an out-of-band communication. In an embodiment, the data defining the HOP heat map and the HOP video frame slice group may be sent to the sink information handling system prior to or concurrently with the video frame associated with the HOP heat map and the HOP video frame slice group being sent to the sink information handling system. In some embodiments, a HOP heat map and identified HOP video frame slice group may be transmitted on parallel network links with transmitted video frames during a video conference session.

In another embodiment, the system and method may include the unusual motion detection system providing data descriptive of a delta HOP heat map. The delta HOP heat map may describe changes in position of the human image within the plurality of video frame slices over a plurality of video frames captured by the video camera and detected by the unusual motion detection system as movement of an object or the user in the captured video frames. The delta HOP heat map indicates changes in probabilities of user presence in video frame slices and, thus, any changes to the original HOP heat map and the HOP video frame slice group. Here, the MMCA may send the data of the delta HOP heat map and the HOP video frame slice group to the sink information handling system in preparation for decoding of the video frames at the sink information handling system after a first video frame and associated HOP heat map or HOP video frame slice group has been sent. The delta HOP heat map may therefor provide additional information to the sink information handling system regarding how the user's image moves within a series of subsequent video frames in another embodiment. The HOP heat map also reduces the amount of data describing how the changes in the HOP heat map instead of sending a new HOP heat map for each video frame sent to the sink or remote information handling system.

In an embodiment, the use of a virtual background may be detected by the MMCA and, with the data describing the HOP heat map and the HOP video frame slice group, the processor may provide the data descriptive of the video frame slices where the user's body is found and, with the execution of a matting algorithm, segmentation algorithm, or other bounding detection algorithms, reduce an area of computation to detect the outline of the user for use with the virtual background application. In this manner, the data provided by the HOP video frame slice group may help to facilitate the detection of a user's outline over the virtual background.

As described, in an embodiment, the processor may execute a first encoding algorithm to encode the data within the HOP video frame slice group for transmission by the MMCA to the sink information handling system while executing a second encoding algorithm having a lower computational burden than the first encoding algorithm to encode data outside of the HOP video frame slice group for transmission by the MMCA to the sink information handling system. In this embodiment, the MMCA may send this distinguishing encoding data to the sink information handling system defining which of the first and second encoding algorithms to use on the video frame slices of the HOP video frame slice group and the video frame slices outside of the HOP video frame slice group. This may be done, in an embodiment, prior to or concurrently with the video frame being sent to the sink information handling system so that the sink information handling system may apply the appropriate decoding algorithms in real-time as the video frames are processed.

In certain embodiments, the processor may execute an AV processing instruction manager used to offload execution of the user presence detection system to an alternative processor in the information handling system. These alternative processors may include a graphical processing unit (GPU), a vision processing unit (VPU), a gaussian neural accelerator (GNA), among other types of processors.

In an embodiment, the processor may execute a decoding processing instruction module to receive, from a remote information handling system, instructions describing how to decode a received video frame from the remote information handling system based on a HOP heat map and HOP video frame slice group produced at the remote information handling system. Thus, the methods and systems described herein may apply equally to the decoding of video frames as to the encoding of video frames by reducing the processing resources consumed in the encoding and decoding processed described herein.

The present specification further describes a method of reducing resource consumption at an information handling system during a video conferencing session. The method may include receiving, from a time-of-flight (TOF) sensor, distance data descriptive of the distance between a user's body and the video camera of the information handling system and executing a multimedia multi-user collaboration application (MMCA) to establish the video conferencing session via a network interface device. The method may also include receiving, from the video camera, a video frame and, with a processor of the information handling system, executing a user presence detection system for: slicing the video frame into a plurality of video frame slices; based on the distance data, creating a human object presence (HOP) heat map assigning a probability of the presence of the user's body within each video frame slice of the video frame, and selecting, among the plurality of video frame slices, that subset of video frame slices with an assigned probability of presence of the user's body appearing in the video frame slices that exceeds a threshold probability. The method may further include creating a HOP heat map and HOP video frame slice group where the user's body is found within the video frame and with a network interface device, sending data defining the HOP video frame slice group to a sink information handling system over the network for decoding of the video frame with the MMCA transmitting the encoded video frames for the video conference session.

The method may further include, with the execution of the MMCA, detecting the actuation of a virtual background and, with the data describing the HOP video frame slice group, providing the data descriptive of the video frame slices where the user's body is found within the boundary detection algorithm used to reduce an area of computation to detect the outline of the user for applying a virtual background.

In an embodiment, the method may include executing a first encoding algorithm to encode the data within the HOP video frame slice group for transmission by the MMCA to the sink information handling system, executing a second encoding algorithm having lower computational requirements than the first encoding algorithm to encode data outside of the HOP video frame slice group for transmission by the MMCA to the sink information handling system. The method may further include sending data to the sink information handling system defining which of the first and second encoding algorithms to use on the video frame slices of the HOP video frame slice group and the video frame slices outside of the HOP video frame slice group.

In an embodiment, the method may include sending data defining the HOP heat map and the HOP video frame slice group to a sink information handling system over the network for decoding of the video frame using an out-of-band (OOB) communication on a network link separate from the encoded video frames. In an embodiment, the OOB communication may send the data defining the HOP heat map and the HOP video frame slice group prior to sending the encoded video frames. The method may also, in some embodiments, send the delta HOP heat map for subsequent video frames instead of a HOP heat map for subsequent video frames.

In an embodiment, the method may include executing an unusual motion detection processing instruction module to calculate a delta HOP heat map descriptive of changes in position of the human image within the plurality of video frame slices over a plurality of video frames captured by the video camera. In an embodiment, this delta HOP heat map may be determined by comparing historic HOP heat maps with a currently created HOP heat map.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

The information handling system 100 described with reference to FIG. 1 may represent a transmitting (e.g., AV media data source or source information handling system) information handling system or a receiving (e.g., AV media data sink or sink information handling system) information handling system in various embodiments. In still other embodiments, information handling system 100 may operate as both a transmitting and a receiving information handling system to both transmit and receive AV media data, as may be the case for an information handling system transmitting video of one participant user while simultaneously executing code instructions for the MMCA 140 to display videos of other participants within a shared user session. In yet another embodiment, the information handling system 100 may operate remotely from all transmitting or receiving information handling systems while executing code instructions of the MICA 140 to coordinate participation within a user session such as a MICA control provider server. Additionally, some or all of the MICA 140 may operate on a server, blade, rack, or cloud-based network maintained and controlled by the manufacturer of several information handling systems, or managed by an employer or enterprise owner of several information handling systems. In such an embodiment, the information handling system 100 may operate within one of these servers, blades, racks, or across various nodes of a cloud-based network to monitor certain performance metrics at each of the plurality of such information handling systems, perform firmware and software updates, confirm security credentials and compliance, and manage user access across the plurality of information handling systems (e.g., as owned by an employer or enterprise corporation). In such an embodiment, each of the plurality of transmitting and receiving information handling systems participating within a user session of the MICA 140 may incorporate an agent or API for an information handling system performance optimizer application, for example. In an embodiment, this information handling system performance optimizer application may facilitate the coordination of the HOP heat map including the HOP video frame slice group or, in another embodiment, the delta HOP heat map with the transmission of video frames among the plurality of information handling systems participating in a video conference session as described herein.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices, as well as, various input/output (I/O) devices 112, such as a keyboard, a mouse, a video/graphic display 110, or any combination thereof. In an embodiment, the I/O devices 112 may each include an associated input/output driver 134 to be executed by the processor 102 in order to enable an operating system of the information handling system 100 and other computer programs to access hardware functions of the input/output devices 112. The information handling system 100 may further include a display driver 118 to enable an operating system of the information handling system 100 and other computer programs to access the video/graphics display device 110. The information handling system 100 may also include a video camera driver 136 which may be part of a streaming media driver in the embodiments below to enable an operating system of the information handling system 100 and other computer programs to access the video camera 114 for acquisition of video frames during the operation of the MA/ICA 140. The information handling system 100 can also include one or more buses 108 operable to transmit communications between the various hardware components. Portions of an information handling system 100 may themselves be considered information handling systems 100 in an embodiment.

Information handling system 100 can include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), graphical processing unit (GPU), vision processing unit (VPU), gaussian neural accelerator (GNA) control logic or some combination of the same. Any of these processing resources may operate to execute code that is either firmware or software code. Moreover, the information handling system 100 can include memory such as main memory 104, static memory 106, and drive unit 116 (volatile (e.g., random-access memory, etc.), nonvolatile (read-only memory, flash memory etc.) or any combination thereof) with computer readable medium 122 storing instructions 124 of the multimedia framework pipeline and infrastructure platform 138 (MFPIP), multimedia multi-user collaboration application 140 (MMCA), multimedia processing control application programming interface 142 (MPCAPI) video frame user presence detection system 144, unusual movement detection system 146, and other software systems instructions of the embodiments described herein. The information handling system 100 can also include one or more buses 108 operable to transmit communications between the various hardware components such as any combination of various input and output (I/O) devices.

The information handling system 100 may further include a video/graphic display device 110. The video/graphic display device 110 in an embodiment may function as a liquid crystal display (LCD), an organic light emitting diode (OLED), a flat panel display, or a solid-state display. Additionally, the information handling system 100 may include an input device 112, such as a cursor control device (e.g., mouse, touchpad, or gesture or touch screen input), and a keyboard. The information handling system 100 can also include a disk drive unit 116.

In an embodiment, the information handling system 100 may include a network interface device 120 that can provide connectivity to a network 126, e.g., a wide area network (WAN), a local area network (LAN), wireless local area network (WLAN), a wireless personal area network (WPAN), a wireless wide area network (WWAN), or other networks. Connectivity may be via wired or wireless connection. The network interface device 120 may operate in accordance with any wired or wireless data communication standards understood by those of skill. For example, to communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one network interface device 120 may operate two or more wireless links.

The network interface device 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well as the NRFR1, NRFR2, bands, and other known bands. In an embodiment, the network interface device 120 with a wireless adapter may transceive within radio frequencies associated with the 5G New Radio (NR) Frequency Range 1 (FR1) or Frequency Range 2 (FR2), or those associated with 4G LTE and other standards predating the 5G communications standards now emerging. NRFR1 may include radio frequencies below 6 GHz. NRFR2 may include radio frequencies above 6 GHz, made available within the now emerging 5G communications standard. Communications within the WLAN or WWAN may be enabled through the use of either an evolved Node B (eNodeB) executing an evolved packet core of an existing LTE system, or a Next Generation Node B (gNodeB) executing the next generation packet core of the 5G cellular standard.

In some embodiments, software, firmware, dedicated hardware implementations such as application specific integrated circuits, programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. For example, one or more audio/visual (AV) processing instruction modules may be code sets with instructions 124 for performing various processing tasks on outgoing or incoming audio or video data streamed by an MMCA 140. Examples of just some AV processing instruction modules may include boundary detection modules, virtual background or blur modules, encode/decode modules, or compression modules. Similarly, the video frame user presence detection system 144 and unusual movement detection system 146 may also be code instructions 124 to executed with the MMCA 140. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions 124, parameters, and profiles or receives and executes instructions 124, parameters, and profiles responsive to a propagated signal, so that a device connected to a network 126 can communicate voice, video or data over the network 126. Further, the instructions 124 may be transmitted or received over the network 126 via the network interface device 120 or a wireless adapter, for example.

The information handling system 100 can include a set of instructions 124 that can be executed to cause the computer system to perform any one or more of the methods or computer-based functions disclosed herein. For example, instructions 124 may execute a MPCAPI 142, a MMCA 140, a MFPIP 138, a video frame user presence detection system video frame user presence detection system 144, the unusual movement detection system 146, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116, main memory 104, and static memory 106, may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 may also contain space for data storage. Further, the instructions 124 may embody one or more of the methods or logic as described herein. For example, instructions relating to the video frame user presence detection system 144, unusual movement detection system 146, MPCAPI 142, MMCA 140, MFPIP 138, various post processing AV processing instruction module for the MMCA 140, software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the video frame user presence detection system 144, MPCAPI 142, MMCA 140, MFPIP 138, may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The video frame user presence detection system 144, unusual movement detection system 146, MPCAPI 142, MMCA 140, and/or MFPIP 138, may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may further include a power management unit (PMU) 128 (a.k.a. a power supply unit (PSU)). The PMU 128 may manage the power provided to the components of the information handling system 100 such as the processor 102, a cooling system, one or more drive units 118, a GPU, VPU, or GNA, the video/graphic display device 110, and other components that may require power when a power button has been actuated by a user. In an embodiment, the PMU 128 may be electrically coupled to the bus 108 to provide this power. The PMU 128 may regulate power from a power source such as a battery 130 or A/C power adapter 132. In an embodiment, the battery 130 may be charged via the A/C power adapter 132 and provide power the to the components of the information handling system 100 when A/C power from the A/C power adapter 132 is removed.

The information handling system 100 may also include a sensor 150 or a plurality of sensors that may be operably connected to the bus 108. The sensor 150 may be associated with computer readable medium 122 that may also contain or access space for data storage in order to store, at least temporarily, data descriptive of the characteristics of a video frame of and during a video conference session executed by the MMCA 140 or characteristics of an environment the user is present within near the information handling system. The sensors 150 may be operatively coupled to a sensor driver 152 to be executed by the processor 102 in order to enable an operating system of the information handling system 100 and other computer programs to access hardware functions of the input/output devices 112.

The sensors 150 may, according to the embodiments of the present specification, perform tasks related to detecting an ambient light around a participant of the video conference session and color vectors and shading in the video frame during a video conference session executed by a MMCA 140. In an embodiment, the sensors 150 may include an ambient light sensor (ALS) to detect the ambient light around the participant or user of the video conference session. In an embodiment, the sensors 150 may include a color sensor to detect color vectors and shading in any number of video frames or at or around the user during the video conference session executed by a MMCA 140. In an embodiment, the video camera 114 (e.g., a webcam) itself may be viewed as a type of sensor 150 when producing or streaming video in real time through the information handling system 100 to other users engaged in the video conference session executed by the MMCA 140. The sensors of the AV processing instruction modules such as those described in connection with FIG. 3 (e.g., 381-388) may use this sensor data to adjust their operations as described herein. In an embodiment, the video camera 114 may be associated with or incorporate a distance sensor (e.g., an infrared light sensor or a TOF sensor 148) or vison engine systems using one or more video cameras 114 or IR cameras that senses a distance an object is away from the camera. In an embodiment, the video camera 114 may be operatively coupled to a MFPIP 138 that receives distance sensor data from the distance sensor and executes an outline detector AV processing instruction module executed by the video processing device to detect an outline of a body of the user to delineate between where a boundary between the image of the user and the virtual background exists. According to an embodiment, of the present specification, the HOP heat map generated by the processor 102 may also facilitate an efficient detection of this outline of the user by reducing the number of video frame slices to be analyzed while the outline detector AV processing instruction module is being executed. This increases the speed at which the outline of the user is detected while concurrently reducing the processing resources used to accomplish this process. With the outline of the user's body detected in each video frame, the color and lighting of a virtual background and an image of a user in any video frame may be adjusted accordingly to also increase the visual composition of each video frame.

As mentioned herein, information handling system 100 may further include an MMCA 140 in an embodiment. The MMCA 140 may be any application that, when executed by the processor 102, initiates a video conference session between a plurality of users such as between the user of the information handling system 100 and another remote user of another information handling system. MMCA 140 may utilize an MMCA central facility server to engage in the video conference. With the MFPIP 138 and MPCAPI 142, the MMCA 140 may transmit to the MFPIP 138 default settings for such processing, reprocessing, encoding, decoding, capture, and display (e.g., via bus 108) of the video frames and present each video frame to the user at the video/graphic display device 110. Examples of a MMCA 140 may include Zoom® developed by Zoom Video Communications, Skype® developed by Skype Technologies of Microsoft, Microsoft Teams® by Microsoft, WebEx® developed by Cisco, GoToMeeting® developed by LogMeIn, among others.

The information handling system 100 may also include a MFPIP 138. The MFPIP 138 may be any video processing system of the information handling system 100 that applies any number of AV processing instruction modules the each of the video frames created as the video camera (e.g., webcam) provides those video frames to the video conference session executed by the MMCA 140. In an embodiment, the MFPIP 138 receives a stream of video frames and, via application of these AV processing instruction modules, adjusts the lighting and color vectors and shading of each of the images as described herein. The MFPIP 138 may also detect the activation or deactivation of a virtual background and adjusts the lighting and color vectors and shading of the video frames.

In the present application, the MFPIP 138 may further assist the processor 102 to execute the video frame user presence detection system 144. The video frame user presence detection system 144 may include any module or algorithm such as a video frame user presence detection module (FIG. 3, 381) to, when executed by the processor 102, detects the presence of a user or a user's body part within a slice of a vide frame. The unusual movement detection system 146, in an embodiment, may include anu module or algorithm such as an unusual motion detection (UMD) processing instruction module that, when executed by the processor 102, causes the AV processing instruction manager 341 to review, over a plurality of video frames, any changes to the position of the HOP video frame slice group. In an embodiment, the execution of the unusual movement detection system 146 may cause the delta HOP heat map to be created as described herein. During operation of the MFPIP 138, the MFPIP 138 may receive a stream of video frames from the video camera driver 136 of the video camera 114. The processor 102 may then evaluate each video frame and, with the execution of the video frame user presence detection system 144, slice each video frame into a plurality of video frame slices. The processor 102 may further receive distance data from the distance sensor such as the TOF sensor 148, vision engine, or other sensor associated with or included with the video camera 114 and, based on that distance data, create a human object presence (HOP) heat map. This HOP heat map may be used to determine which of the video frame slices the user's body or any portion of the user's body is present.

To create the HOP heat map, the processor 102 executes code of the user presence detection system 144 configured to assign a probability of the presence of the user's body within each video frame slice of the video frame. The processor 102 may do this by executing a human versus object detection (HOD) algorithm that analyzes the distance data associated with each slice of the video frame and assigns an integer value of between 0 and 100, for example, and where a threshold integer value is met, a probability value is assigned to each slice of the video frame. For example, the distance data received from the TOF sensor 148 or other sensor acquired within a first slice of a video frame may indicate that an object is about 610 mm (about 2 feet) from the video camera 114. Similarly, the distance data acquired within a second slice of a video frame may indicate that an object is about 1830 mm (about 6 feet) from the video camera. The HOD algorithm may determine that, in the context of the execution of the MMCA 140, the object that is about 610 mm from the video camera 114 indicates a higher probability that a human is present and detected, at least, within the first slice of the video frame. The HOD algorithm may make similar determinations with regard to the second slice of the video frame and, due to the significantly longer distances detected, the 1830 mm distances indicate a wall is present behind the user (and lower probability of a human presence). In an embodiment, where no distance data is found for the second slice, this may indicate that the distance sensor cannot detect either a user or an object behind the user (e.g., any wall, if present, is too far behind the user to be detected) and the processor 102 executing the HOD algorithm may determine that the other slices (e.g., the first slice) includes a human image.

During execution of the HOD algorithm by the processor 102, in an embodiment, the distance data associated with each slice of the video frame may be compared to each other and the threshold distance may be calculated based on distance data among all of the slices of the video frames. In this embodiment, a scale may be created where the shortest distance data detected among all distance data in each slice of the video frame is assigned a highest value (e.g., 100) while the longest distance data detected among all distance data in each slice is assigned a lowest value (e.g., 0). In this embodiment, a probability value of, for example 51 based on distance detected is assigned to the first slice of the video frame may indicate a probability of the presence of a human object within that first video frame when the threshold value is assigned to be 50. Thus, in this example embodiment, because the threshold value is set to 50 any object within any given slice with a probability based on distance detection falling in the range of 51-100 may be indicated by the execution of the HOD algorithm by the processor as being a human object while any object within any given slice falling in the range of 0-50 may not be indicated as being a human object.

In an alternative embodiment, the distance data associated with each slice of the video frame may be compared to each other and the threshold distance may be calculated based on distance data among all of the slices of the video frames using a different scale where the highest value is set to be the location of the video camera 114. In this embodiment, a scale may be created where the shortest distance data is not detected and instead the location of the video camera 114 is assigned the highest value (e.g., 100). The execution of the HOD algorithm by the processor 102 may cause the assignment of the longest distance data detected among all distance data in each slice as the lowest value (e.g., 0). In this embodiment, a distance-based probability value of, for example 51 assigned to the first slice of the video frame may indicate a probability of the presence of a human object within that first video frame when the threshold value is assigned to be 50. Thus, in this example embodiment, because the threshold value is set to 50 any object within any given slice falling in the range of 51-100 may be indicated by the execution of the HOD algorithm as being a human object while any object within any given slice falling in the range of 0-50 may not be indicated as being a human object. In this embodiment, therefore, the distance between the video camera 114 and a background of the user may be the initial scaling distance used to determine whether any intermediate objects such as parts of the user's body are detected.

In any scaling example described herein, the execution of the HOD algorithm by the processor 102, allows the processor 102 to assign a value or probability value to each slice of the video frame. Again, a probability threshold value may be assigned to each slice of the video frame indicating a probability of presence of the user's body within each respective slice. From this data, the HOP heat map is generated by the video frame user presence detection system 144.

The generation of the HOP heat map allows the processor 102 executing the video frame user presence detection system 144 to designate a HOP video frame slice group that groups together each slice of the video frame where the presence of the user's body has been detected (e.g., distance data exceeds a threshold value). By grouping a number of slices together to create the HOP video frame slice group, the video frame user presence detection system 144 may know where, within the video frame, the user's image resides. During video conferencing sessions, the user usually sits in front of the video camera 114 anywhere from 2 to 3 feet from the video camera 114. As such, the video frame includes an image of the user's body (usually from the chest up) with a background behind the user. The image of the user may be considered the most important part of the video frame and, according to the embodiments described herein, may be encoded differently than those slices of the video frame that are not included as being part of the HOP video frame slice group. In an embodiment, the HOP video frame slice group may be encoded using a first encoding algorithm by the encoding AV processing instruction module (e.g., 383 in FIG. 3) that may be more robust in error concealment for lost packets but require higher computing resources. Those slices falling outside of the HOP video frame slice group may be encoded using a second encoding algorithm by the encoding AV processing instruction module (e.g., 383 in FIG. 3) having a lower computational burden than the first encoding algorithm. This allows the processor to encode slices of the video frame differently such that processing resources are reserved while the visual composition of the user's image within video frames is not compromised while less emphasis for encoding effort is allocated to probable background portions of the video frame.

In order to properly decode the encoded video frame, the sink information handling system receiving the video frames may be provided with data associated with the HOP heat map and its HOP video frame slice group created by the processor 102. This data may include, among others, data describing the number of slices of the video frame, those slices that fall within the HOP video frame slice group, those slices the fell outside of the HOP video frame slice group (may be determined by default), the encoding algorithm used by the source information handling system 100 to encode the HOP video frame slice group, and the encoding algorithm used by the source information handling system 100 to encode the slices not present within the HOP video frame slice group. This allows the sink information handling system to properly decode the video frame as the stream of video frames is sent to the sink information handling systems from the information handling system 100.

The data associated with the HOP heat map and its HOP video frame slice group may, in an embodiment, be sent to the sink information handling systems prior to or concurrently with the video frames associated with the HOP heat map and its HOP video frame slice group. In an embodiment, the data associated with the HOP heat map and its HOP video frame slice group may be sent to these sink information handling systems using an out-of-band (OOB) communication method over an OOB communication link. In an embodiment, the OOB communication link may be different from the communication link used by the information handling system 100 to send the video frames to the sink information handling systems engaged in the video conferencing session.

In addition to sending data associated with the HOP heat map and its HOP video frame slice group for an initial video frame in an alternate embodiment, the information handling system 100 may also send to the sink information handling systems a data descriptive of a delta HOP heat map for subsequent video frames. The delta HOP heat map may describe changes in position of the human image within the plurality of video frame slices over a plurality of video frames captured by the video camera. In a specific embodiment, the delta HOP heat map may include data descriptive of only those changes in the subsequent video frame as compared to the originally sent HOP heat map. In this embodiment, the HOP video frame slice group may change location and size within any given video frame. This delta HOP heat map may describe these changes to the HOP video frame slice group as the user, for example, moves left, right, forward, or backwards during the video conferencing session. Similar to the data associated with the HOP heat map and its HOP video frame slice group, the data associated with the delta HOP heat map and adjusted HOP video frame slice group may be sent to the sink information handling systems before or concurrently with the video frames being sent. By subsequently sending the delta HOP heat map instead of a new HOP heat map for each video frame, the processing resources used to encode and decode the video frame may be further reduced and the data transmitted to describe the HOP heat map is also reduced.

In an embodiment, the data associated with the delta HOP heat map may be sent using an OOB communication method over an OOB communication link. In an embodiment, the OOB communication link may be different from the communication link used by the information handling system 100 to send the video frames to the sink information handling systems engaged in the video conferencing session.

In an embodiment, the data associated with the HOP heat map or delta HOP heat map may be leveraged to lower computations used to initially form the video frames. In an embodiment, this data may be used to lower the processing resources used to form images within those slices that fall outside of the HOP video frame slice group. In an embodiment, the data associated with the HOP video frame slice group may also be used to help to reduce the processing resources used to create that image data in frame slices that fall outside of the HOP video frame slice group in a subsequently generated video frame.

In an example, the methods described herein may also include an optimization of the quality of the video frames produced by the video camera 114 (e.g., webcam) and used during the video conference session executed by the MMCA 140. This optimization process may be used to change the color vectors, shading, lighting, and background of the video frames using any of a plurality of AV processing instruction modules to do so. These AV processing instruction modules may be created by using individual video frames as input into a neural network and, via an integrated feedback loop and/or machine learning system, produce as output optimized settings for executing these AV processing instruction modules. In an embodiment, the information handling system 100 may include this neural network used to optimize or adjust settings for these AV processing instruction modules. In some embodiments, these AV processing instruction modules are developed remotely and operated remotely from the information handling system 100 and the output optimized settings are transmitted to the AV processing instruction modules by these remote systems to the information handling system 100. In embodiment, the video frames produced by the video camera 114 of the information handling system 100 are used as specific input to the integrated feedback loop and/or machine learning system in order to develop setting adjustments, of any, to the AV processing instruction modules used in the presently described system and method. In an embodiment, any video frames or even still images may be used to develop the neural network output setting adjustments to the AV processing instruction modules used in the presently described system and method. Wherever this feedback loop and/or machine learning system is located, the feedback loop and/or machine learning system and method may provide specific types of adjustments to one or more AV processing instruction modules used by the processor 102 or any other processing device associated with the MFPIP 138 to adjust the color vectors and shading, lighting, and background of the streaming video frames received at the MFPIP 138.

In an embodiment, the information handling system 100 includes a MPCAPI 142. The MPCAPI 142 in an embodiment may operate to facilitate communication between various applications, controllers, and drivers of the information handling system 100 in an embodiment. For example, the MPCAPI 142 may interface between the MFPIP 138 and the sensors 150 such as the video camera 114, the distance sensor associated with the video camera 114, the ALS, and the CRGB, among others. The MPCAPI 142 may, during operation of the information handling system 100, receive the individual video frames and direct the AV processing instruction modules and the video frame user presence detection module to be applied. In an embodiment, the MPCAPI 142 may conduct an offloading process where the MPCAPI 142 selects among a plurality of processing resources to apply these AV processing instruction modules to each frame. For example, instead of using the processing resources associated with the processor 102, the MPCAPI 142 may direct a graphical processing unit (GPU), vision processing unit (VPU), gaussian neural accelerator (GNA) control logic or some combination of the same to process this data. This may allow for the processor 102 to engage in other processing activities during the video conference session executed by the MMCA 140. Still further, the MPCAPI 142 may cause data from each of the sensors 150 and the video camera 114, via the sensor drivers 136 and video camera driver 136, to be sent to this other processing resource at the MFPIP 138.

In an embodiment, the MFPIP 138, MMCA 140, and MPCAPI 142, may communicate with the main memory 104, the processor 102, the video/graphic display device 110, a keyboard, and the network interface device 120 via bus 108, and several forms of communication may be used, including ACPI, SMBus, a 24 MHZ BFSK-coded transmission channel, or shared memory. Driver software, firmware, controllers and the like may communicate with applications on the information handling system 100.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
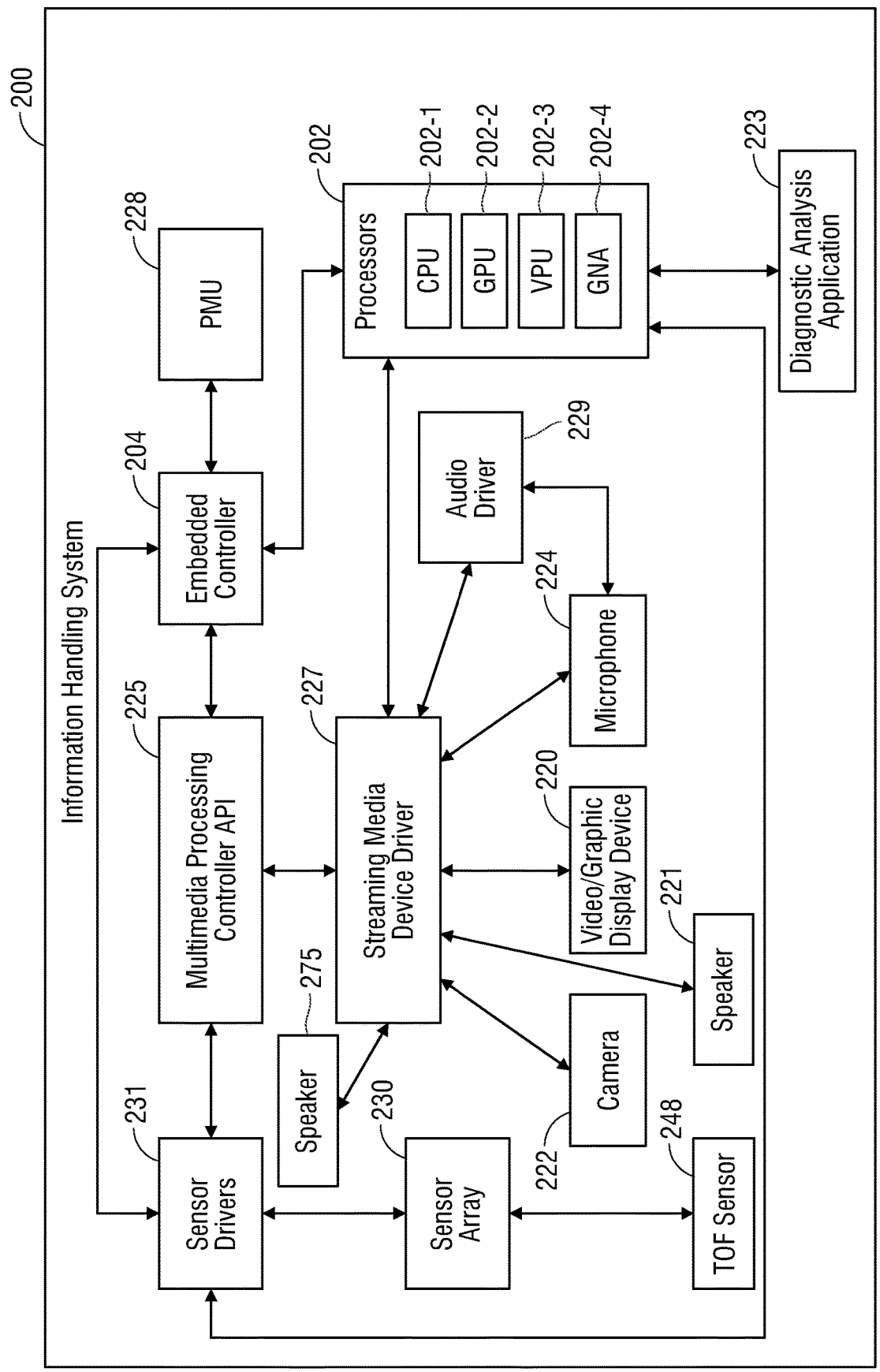
FIG. 2 is a block diagram illustrating various drivers and processors in communication with a plurality of peripheral devices of an information handling system according to an embodiment of the present disclosure.

FIG. 2 is a block diagram illustrating various drivers and processors 202 in communication with a plurality of peripheral devices of an information handling system according to an embodiment of the present disclosure. FIG. 2 shows the operative couplings of a number of devices and processes present and executed within the information handling system 200 during operation of the information handling system 200. During operation, the information handling system 200 may be powered on via use of an on switch on the PMU 228. The PMU 228 may power on an embedded controller 204 that, in an embodiment, executes a basic input/output system (BIOS) and, in an embodiment, an operating system (OS).

As described herein, the information handling system 200 may include a MPCAPI 225. The MPCAPI 225, in an embodiment, may operate to facilitate communication between various applications, controllers, and drivers of the information handling system 200 in an embodiment. For example, the MPCAPI 225 may interface between a MFPIP and the sensors of the sensor array 230 such as the video camera, an ambient light sensor (ALS), a color sensor (CRGB), and the TOF sensor 248, among others. The MPCAPI 225 may, during operation of the information handling system 200, receive the individual video frames and direct the video frame user presence detection module, unusual movement detection processing instruction module, and any other AV processing instruction modules to be applied to each video frame.

The streaming media driver 227, in such an embodiment, may receive video or audio samples captured by peripheral cameras 222 or microphones 224 in communication therewith, according to default or optimized media capture instructions. The video driver may play back audio samples via speaker 221. In an embodiment, the audio driver 229 may receive audio samples captured by the microphone 224 in communication therewith, according to such received media capture instructions. The audio driver 229 or streaming media driver 227 may play back audio samples via a speaker 221. In such an embodiment, the audio driver 229 may operate as a mini-driver or child device to the parent device streaming media driver 227. The streaming media device driver 227 may be in communication with an AV processing instruction manager via one or more ports (e.g., as described in greater detail with respect to the of FIG. 4) such that video or audio samples received by the streaming media device driver 227 may be transmitted to an AV processing instruction manager, in an embodiment. The audio driver 229 may be in communication with the AV processing instruction manager such that audio samples received by the audio driver 229 may be transmitted to the AV processing instruction manager (e.g., via the audio processing engine, or via the streaming media driver, for example) in an embodiment. In such a way, the AV processing instruction manager may direct retrieval of a video sample captured at a video camera 222 operably connected to information handling system 200 and retrieval of an audio sample captured at a microphone operably connected to information handling system 200.

During operation, the processor 202 may acquire distance data from a distance sensor such as the TOF sensor 248. This distance data may be used to create a human object presence (HOP) heat map. This HOP heat map may be used to determine which of the video frame slices the user's body or any portion of the user's body is present according to various embodiments herein.

To create the HOP heat map, the processor 202 executes code of the unusual movement detection system 146 may be configured to assign a probability of the presence of the user's body within each video frame slice of the video frame. The processor 202 may do this by executing a human versus object detection (HOD) algorithm that analyzes the distance data associated with each slice of the video frame and assigns an integer value of between 0 and 100, for example, and where a threshold integer value is met, a probability value is assigned to each slice of the video frame. For example, the distance data received from the TOF sensor 148 or other sensor acquired within a first slice of a video frame may indicate that an object is about 610 mm (about 2 feet) from the video camera 222. Similarly, the distance data acquired within a second slice of a video frame may indicate that an object is about 1830 mm (about 6 feet) from the video camera. The HOD algorithm may determine that, in the context of the execution of the MMCA, the object that is about 610 mm from the video camera 222 indicates a higher probability that a human is present and detected, at least, within the first slice of the video frame. The HOD algorithm may make similar determinations with regard to the second slice of the video frame and, due to the significantly longer distances detected, the 1830 mm distances indicate a wall is present behind the user (and lower probability of a human presence). In an embodiment, where no distance data is found for the second slice, this may indicate that the distance sensor cannot detect either a user or an object behind the user (e.g., any wall, if present, is too far behind the user to be detected) the HOD algorithm may determine that the other slices (e.g., the first slice) includes a human image.

During execution of the HOD algorithm by the processor 202, in an embodiment, the distance data associated with each slice of the video frame may be compared to each other and the threshold distance may be calculated based on distance data among all of the slices of the video frames. In this embodiment, a scale may be created where the shortest distance data detected among all distance data in each slice of the video frame is assigned a highest value (e.g., 100) while the longest distance data detected among all distance data in each slice is assigned a lowest value (e.g., 0). In this embodiment, a probability value of, for example 51 based on distance detected is assigned to the first slice of the video frame may indicate a probability of the presence of a human object within that first video frame when the threshold value is assigned to be 50. Thus, in this example embodiment, because the threshold value is set to 50 any object within any given slice with a probability based on distance detection falling in the range of 51-100 may be indicated by the HOD algorithm as being a human object while any object within any given slice falling in the range of 0-50 may not be indicated as being a human object. The present specification contemplates that the threshold value may be set to any value and, in some embodiments, may be set by the user based on where the camera 222 is placed relative to the user as well as the surrounding environment the user is in.

In an alternative embodiment, the distance data associated with each slice of the video frame may be compared to each other and the threshold distance may be calculated based on distance data among all of the slices of the video frames using a different scale where the highest value is set to be the location of the video camera 222. In this embodiment, a scale may be created where the shortest distance data is not detected and instead the location of the video camera 222 is assigned the highest value (e.g., 100). The HOD algorithm may then assign the longest distance data detected among all distance data in each slice as the lowest value (e.g., 0). In this embodiment, a distance-based probability value of, for example 51 assigned to the first slice of the video frame may indicate a probability of the presence of a human object within that first video frame when the threshold value is assigned to be 50. Thus, in this example embodiment, because the threshold value is set to 50 any object within any given slice falling in the range of 51-100 may be indicated by the HOD algorithm as being a human object while any object within any given slice falling in the range of 0-50 may not be indicated as being a human object. In this embodiment, therefore, the distance between the video camera 222 and a background of the user may be the initial scaling distance used to determine whether any intermediate objects such as parts of the user's body are detected. Again, the present specification contemplates that the threshold value may be set to any value and, in some embodiments, may be set by the user based on where the camera 222 is placed relative to the user as well as the surrounding environment the user is in.

In any scaling example described herein, the execution of the HOD algorithm by the processor 202, allows the processor 202 to assign a value or probability value to each slice of the video frame. Again, a probability threshold value may be assigned to each slice of the video frame indicating a probability of presence of the user's body within each respective slice. From this data, the HOP heat map is generated by the video frame user presence detection system 144.

The generate of the HOP heat map allows the processor 202 executing the video frame user presence detection system 144 to designate a HOP video frame slice group that groups together each slice of the video frame where the presence of the user's body has been detected (e.g., distance data exceeds a threshold value). By grouping a number of slices together to create the HOP video frame slice group, the video frame user presence detection system 144 may know where, within the video frame, the user's image resides. During video conferencing sessions executed by the MMCA, the user usually sits in front of the video camera 222 anywhere from 2 to 3 feet from the video camera 222. The microphone 224 may also be placed nearby to acquire voice data. Because of the placement of the video camera 222, the video frame includes an image of the user's body (usually from the chest up) with a background behind the user. The image of the user may be considered the most important part of the video frame and, according to the embodiments described herein, may be encoded differently than those slices of the video frame that are not included as being part of the HOP video frame slice group. In an embodiment, the HOP video frame slice group may be encoded using a first encoding algorithm by the encoding AV processing instruction module (e.g., 383 in FIG. 3) those slices falling outside of the HOP video frame slice group may be encoded using a second encoding algorithm by the encoding AV processing instruction module (e.g., 383 in FIG. 3) having a lower computational burden than the first encoding algorithm. This allows the processor 202 to encode slices of the video frame differently such that processing resources are reserved while the visual composition of the user's image within video frames is not compromised. Some of these encoding processes may be orchestrated through the MPCAPI 225 as described herein while less emphasis for encoding effort is allocated to probable background programs.

In order to properly decode the encoded video frame, the sink information handling system may be provided with data associated with the HOP heat map and its HOP video frame slice group created by the processor 202. This data may include, among others, data describing the number of slices of the video frame, those slices that fall within the HOP video frame slice group, those slices the fell outside of the HOP video frame slice group (may be determined by default), the encoding algorithm used by the source information handling system 200 to encode the HOP video frame slice group, and the encoding algorithm used by the source information handling system 200 to encode the slices not present within the HOP video frame slice group. This allows the sink information handling system to properly decode the video frame as the stream of video frames is sent to the sink information handling systems from the information handling system 200.

The data associated with the HOP heat map and its HOP video frame slice group may, in an embodiment, be sent to the sink information handling systems prior to or concurrently with the video frames associated with the HOP heat map and its HOP video frame slice group. In an embodiment, the data associated with the HOP heat map and its HOP video frame slice group may be sent to these sink information handling systems using an out-of-band (OOB) communication method over an OOB communication link initiated by, for example, the embedded controller 204 and in communication with an information handling system performance optimizer application (e.g., FIG. 5, 575). In an embodiment, the OOB communication link may be different from the communication link used by the information handling system 200 to send the video frames to the sink information handling systems engaged in the video conferencing session.

In addition to sending data associated with the HOP heat map and its HOP video frame slice group for an initial video frame in an alternate embodiment, the information handling system 200 may also send to the sink information handling systems a data descriptive of a delta HOP heat map for subsequent video frames. The delta HOP heat map may describe changes in position of the human image within the plurality of video frame slices over a plurality of video frames captured by the video camera 222. In this embodiment, the HOP video frame slice group may change location and size within any given video frame. This delta HOP heat map may describe these changes to the HOP video frame slice group as the user, for example, moves left, right, forward, or backwards during the video conferencing session. Similar to the data associated with the HOP heat map and its HOP video frame slice group, the data associated with the delta HOP heat map and adjusted HOP video frame slice group may be sent to the sink information handling systems before or concurrently with the video frames being sent. In an embodiment, the data associated with the delta HOP heat map may be sent using an OOB communication method over an OOB communication link. In an embodiment, the OOB communication link may be different from the communication link used by the information handling system 200 to send the video frames to the sink information handling systems engaged in the video conferencing session.

During the operation of the information handling system 200, drivers may be executed by the processor 202 to enable an OS of the information handling system 200 and other computer programs to access hardware functions of the input/output devices, sensors of the sensor array 230 such as the TOF sensor 248, and the video camera 222, among others. These drivers working through a streaming media device driver 227 may help to facilitate the transmission of data from the individual sensors to the processor 202 or other processing device responsible for creating the HOP heat map and delta HOP heat map as described herein.

In an embodiment, the information handling system 200 may include a microphone 224 that provides audio input to the video conference session along with the video input from the video camera 222. The audio may be provided to any user engaged in the video conference session in real-time to facilitate the interaction between the users over the network.

In an embodiment, the information handling system 200 may include a video/graphic display device 220. The video/graphic display device 220 may be used to present decoded video frames, in a streaming manner, to the user for viewing of the other users during the video conferencing session. Audio may also be received at the information handling system 200 via the streaming media device driver 227 and provided at a speaker 275 for real-time audio output to the user.

Figure 3:
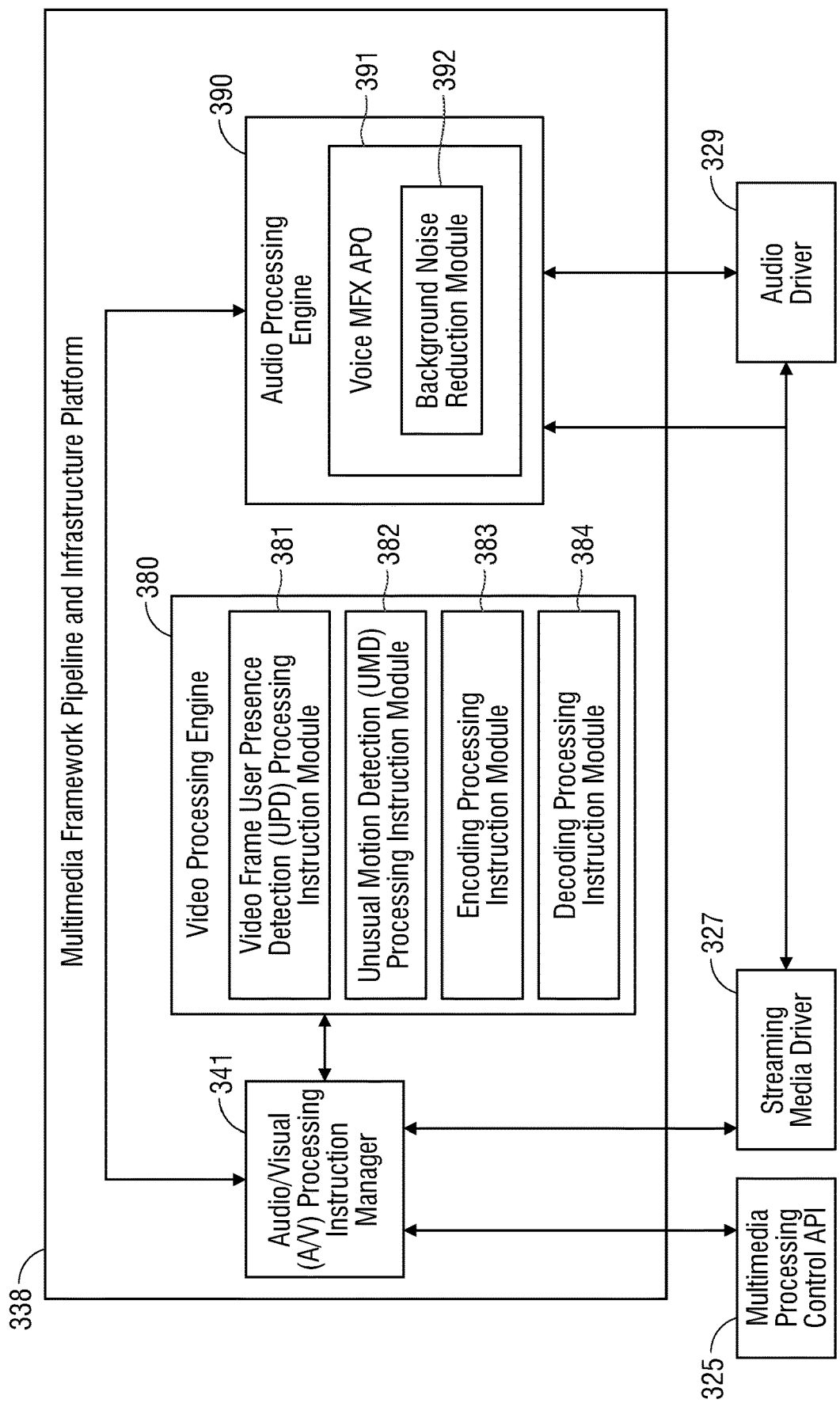
FIG. 3 is a block diagram illustrating a multimedia framework pipeline and infrastructure platform of an information handling system according to an embodiment of the present disclosure.

FIG. 3 is a block diagram illustrating a MFPIP 338 of an information handling system according to an embodiment of the present disclosure. The MFPIP 338, in the present embodiment, may form part of the information handling system such as those described in connection with FIGS. 1 and 2. In an embodiment, the MFPIP 338 may be remote from the information handling system as part of a distributed peer computer system that provides processing of the video frames of the video conference session remotely for a thin-client-type information handling system.

The MFPIP 338 may interface with a number of drivers via streaming media driver 327 of the information handling system as described herein in order to enable an operating system of the information handling system and other computer programs to access the devices used during the execution of the processor of the information handling system. The streaming media driver 327 may be a driver that, when executed by the processor, enable the operating system of the information handling system and other computer programs to distribute the video frames, as encoded/decoded by operation of the MFPIP 338 as described herein. This data stream provided by the streaming media driver 327 may be sent across a network via, for example, a network interface device of the information handling system as described herein. The streaming media driver 327 in such an embodiment may receive video or audio samples captured by peripheral cameras or microphones in communication therewith, according to default or optimized media capture instructions, as described with reference to FIG. 2. In another embodiment, the audio driver 329 may receive audio samples captured by a microphone in communication therewith, according to such received media capture instructions. In such an embodiment, the audio driver 329 may operate as a mini-driver or child device to the parent device streaming media driver 327. The streaming media driver 327 may be in communication with the AV processing instruction manager 341 via one or more ports (e.g., as described in greater detail with respect to the device proxy of FIG. 4) such that video or audio samples received by the streaming media driver 327 may be transmitted to the AV processing instruction manager 341 in an embodiment. The audio driver 329 may be in communication with the AV processing instruction manager 341 such that audio samples received by the audio driver 329 may be transmitted to the AV processing instruction manager 341 (e.g., via the audio processing engine 390, or via the streaming media driver 327) in an embodiment. In such a way, the AV processing instruction manager 341 may direct retrieval of a video samples (e.g., video frames) captured at a camera operably connected to information handling system and retrieval of an audio samples captured at a microphone operably connected to information handling system.

The audio driver 329 may interface with the operating system and be executed by the processor in order to drive, for example, a specific audio device such as a microphone and an audio card. The audio driver 329 may, in the embodiments herein, interface with an audio processing engine 390 that includes a voice mode effects audio processing object (MFX APO) 391. The driver may allow the MFX APO 391 to interface with the operating system in order to provide audio during the video conference session executed on the MMCA 140. In an embodiment, the MFX APO 391 provides software based digital signal processing for the video conference session. Examples of a MFX APO 391 include graphic equalizers, reverb, tremolo, Acoustic Echo Cancellation (AEC) and Automatic Gain Control (AGC). In an embodiment, the MFX APO 391 may be COM-based, real-time, in-process objects. During execution of the MFX APO 391, a background noise reduction module 392 or any other audio-based AV processing instruction module may be executed to adjust the audio output during the video conference session.

The MFPIP 338 may include a driver stack working with the streaming media driver 327 that operates other drivers such as those associated with the sensors. For example, and in the embodiments here, the sensors may include a distance sensor (e.g., TOF sensor), an ALS, and a CRGB that detect the ambient light around the user (e.g., ambient luminance and color/temperature). These sensors may help inform, as input, as to how to handle image brightness based on the ambient conditions as well as how to create the HOP heat map or delta HOP heat map as described herein. The driver stack working with the streaming media driver 327 may therefore be a combination of drivers that plug into each other with each of the drivers adding to a chain of drivers that may be executed in serial by the processor. For example, the driver associated with the video camera of the information handling system may be executed prior to any of the sensors so that a video frame may first be obtained prior to the data from the sensors being used to adjust the visual composition of the video frame and create the HOP heat map or delta HOP heat map.

As mentioned, MFPIP 338 may also include an AV processing instruction manager 341. The AV processing instruction manager 341 may be any processor that coordinates operation of the AV processing as described herein and cause one or more AV processing instruction modules to be used to visually transform the one or more video frames during the execution of the video conference session. The AV processing instruction manager may utilize, for example, a CPU, a GPU, a VPU, a GNA or a combination of these processing devices to complete the operations and methods described herein. The AV processing instruction manager 341 may interface with a video processing engine 380 to cause one or more of the video frame user presence detection module 381, unusual motion detection processing instruction module 382, encoding processing instruction module 383, decoding processing instruction module 384, or any other AV processing instruction modules to be executed so as to generate the HOP heat map, generate the delta HOP heat map, or apply the appropriate encoding or decoding algorithms to each video frame generated at the information handling system or a remote information handling system according to the principles described herein.

For example, the AV processing instruction manager 341 may receive input from the streaming media driver 327 in the form of streaming AV media files that include, among other data, individual video frames. In this embodiment, the AV processing instruction manager 341 may cause the video processing engine 380 to execute the video frame user presence detection module 381. As described herein, the video frame user presence detection module 381, when executed, may slice each video frame into a plurality of video frame slices. The number and position of the video frame slices created may be selected to most efficiently detect the presence and non-presence of a user within the video frame. The AV processing instruction manager 341 may further receive distance data from the distance sensor such as a TOF sensor associated with or included with the video camera and, based on that distance data, create a HOP heat map. This HOP heat map may be used to determine which of the video frame slices the user's body or any portion of the user's body is present.

To create the HOP heat map, the Videoframe user presence detection AV processing instruction module 381 may be configured to assign a probability of the presence of the user's body within each video frame slice of the video frame through the execution of the video frame user presence detection processing instruction module 381. The videoframe user presence detection AV processing instruction module 381 may do this by executing a HOD algorithm that analyzes the distance data associated with each slice of the video frame and assigns an integer value of between 0 and 100, for example, and where a threshold integer value is met, a probability value is assigned to each slice of the video frame. For example, the distance data received from the TOF sensor 148 or other sensor acquired within a first slice of a video frame may indicate that an object is about 610 mm (about 2 feet) from the video camera. Similarly, the distance data acquired within a second slice of a video frame may indicate that an object is about 1830 mm (about 6 feet) from the video camera. The execution of the HOD algorithm by the videoframe user presence detection AV processing instruction module 381 may determine that, in the context of the execution of the MMCA, the object that is about 610 mm from the video camera indicating a higher probability that a human is present and detected, at least, within the first slice of the video frame. The execution of the HOD algorithm may allow the videoframe user presence detection AV processing instruction module 381 to make similar determinations with regard to the second slice of the video frame and, due to the significantly longer distances detected, the 1830 mm distances indicate a wall is present behind the user. In an embodiment, where no distance data is found for the second slice, this may indicate that the distance sensor cannot detect either a user or an object behind the user (e.g., any wall, if present, is too far behind the user to be detected) and the videoframe user presence detection AV processing instruction module 381 executing the HOD algorithm may determine that the other slices (e.g., the first slice) includes a human image.

During execution of the HOD algorithm by the processor 102, in an embodiment, the distance data associated with each slice of the video frame may be compared to each other and the threshold distance may be calculated based on distance data among all of the slices of the video frames. In this embodiment, a scale may be created where the shortest distance data detected among all distance data in each slice of the video frame is assigned a highest value (e.g., 100) while the longest distance data detected among all distance data in each slice is assigned a lowest value (e.g., 0). In this embodiment, a probability value of, for example 51 based on distance detected is assigned to the first slice of the video frame may indicate a probability of the presence of a human object within that first video frame when the threshold value is assigned to be 50. Thus, in this example embodiment, because the threshold value is set to 50 any object within any given slice with a probability based on distance detection falling in the range of 51-100 may be indicated by the videoframe user presence detection AV processing instruction module 381 executing the HOD algorithm as being a human object while any object within any given slice falling in the range of 0-50 may not be indicated as being a human object.

In an alternative embodiment, the distance data associated with each slice of the video frame may be compared to each other and the threshold distance may be calculated based on distance data among all of the slices of the video frames using a different scale where the highest value is set to be the location of the video camera. In this embodiment, a scale may be created where the shortest distance data is not detected and instead the location of the video camera is assigned the highest value (e.g., 100). The videoframe user presence detection AV processing instruction module 381 executing the HOD algorithm may then assign the longest distance data detected among all distance data in each slice as the lowest value (e.g., 0). In this embodiment, a distance-based probability value of, for example 51 assigned to the first slice of the video frame may indicate a probability of the presence of a human object within that first video frame when the threshold value is assigned to be 50. Thus, in this example embodiment, because the threshold value is set to 50 any object within any given slice falling in the range of 51-100 may be indicated by the videoframe user presence detection AV processing instruction module 381 executing the HOD algorithm as being a human object while any object within any given slice falling in the range of 0-50 may not be indicated as being a human object. In this embodiment, therefore, the distance between the video camera and a background of the user may be the initial scaling distance used to determine whether any intermediate objects such as parts of the user's body are detected.

In any scaling example described herein, the execution of the HOD algorithm by the videoframe user presence detection AV processing instruction module 381, allows the videoframe user presence detection AV processing instruction module 381 to assign a value or probability value to each slice of the video frame. Again, a probability threshold value may be assigned to each slice of the video frame indicating a probability of presence of the user's body within each respective slice. From this data, the HOP heat map is generated via execution of the video frame user presence detection processing instruction module 381.

The generation of the HOP heat map allows the videoframe user presence detection AV processing instruction module 381 executing the video frame user presence detection processing instruction module 381 to designate a HOP video frame slice group that groups together each slice of the video frame where the presence of the user's body has been detected (e.g., distance data exceeds a threshold value). By grouping a number of slices together to create the HOP video frame slice group, the videoframe user presence detection AV processing instruction module 381 executing the video frame user presence detection processing instruction module 381 may determine where, within the video frame, the user's image resides. During video conferencing sessions, the user usually sits in front of the video camera anywhere from 2 to 3 feet from the video camera. As such, the video frame includes an image of the user's body (usually from the chest up) with a background behind the user. The image of the user may be considered the most important part of the video frame and, according to the embodiments described herein, may be encoded differently than those slices of the video frame that are not included as being part of the HOP video frame slice group. In an embodiment, the HOP video frame slice group may be encoded using a first encoding algorithm and upon execution of the encoding processing instruction module 383 by the AV processing instruction manager 341. Additionally, those slices falling outside of the HOP video frame slice group may be encoded using a second encoding algorithm having a lower computational burden than the first encoding algorithm upon execution of the encoding processing instruction module 383 by the AV processing instruction manager 341 executing the encoding AV processing instruction module 383. This allows the AV processing instruction manager 341 to direct encode slices of the video frame differently such that processing resources are reserved while the visual composition of the user's image within video frames is not compromised while less emphasis for encoding effort is allocated to probable background programs.

In order to properly decode any encoded video frames received at a sink information handling system, the sink information handling system may be provided with data associated with the HOP heat map and its HOP video frame slice group created by the AV processing instruction manager 341. This data may include, among others, data describing the number of slices of the video frame, those slices that fall within the HOP video frame slice group, those slices the fell outside of the HOP video frame slice group (may be determined by default), the encoding algorithm used by the source information handling system to encode the HOP video frame slice group, and the encoding algorithm used by the source information handling system to encode the slices not present within the HOP video frame slice group. This data allows the sink information handling system to properly decode the video frame as the stream of video frames is sent to the sink information handling systems from the information handling system.

The data associated with the HOP heat map and its HOP video frame slice group may, in an embodiment, be sent to the sink information handling systems prior to or concurrently with the video frames associated with the HOP heat map and its HOP video frame slice group. In an embodiment, the data associated with the HOP heat map and its HOP video frame slice group may be sent to these sink information handling systems using an OOB communication method over an OOB communication link. In an embodiment, the OOB communication link may be different from the communication link used by the information handling system to send the video frames to the sink information handling systems engaged in the video conferencing session.

The information handling system may also receive video frames from remote information handling systems also engaged in the video conferencing session executed by a MMCA. In this embodiment, the AV processing instruction manager 341 may receive similar HOP heat map data and HOP video frame slice group data from these remote information handling systems as well as encoding algorithm data used to encode the slices within the video frames received. The AV processing instruction manager 341 may execute a decoding processing instruction module 384 to decode the video frames accordingly by using the appropriate decoding algorithms.

In addition to sending data associated with the HOP heat map and its HOP video frame slice group, the information handling system may also send to any sink information handling systems a data descriptive of a delta HOP heat map. The AV processing instruction manager 341 may create the delta HOP heat map by executing an unusual motion detection processing instruction module 382. The execution of the unusual motion detection processing instruction module 382 causes the AV processing instruction manager 341 to review, over a plurality of video frames, any changes to the position of the HOP video frame slice group. The delta HOP heat map may, therefor, describe changes in position of the human image within the plurality of video frame slices over a plurality of video frames captured by the video camera. In this embodiment, the HOP video frame slice group may change location and size within any given video frame presented at the MFPIP 338. This delta HOP heat map may describe these changes as the user, for example, moves left, right, forward, or backwards during the video conferencing session. Similar to the data associated with the HOP heat map and its HOP video frame slice group, the data associated with the delta HOP heat map may be sent to the sink information handling systems before or concurrently with the video frames being sent. In an embodiment, the data associated with the delta HOP heat map may be sent using an OOB communication method over an OOB communication link. In an embodiment, the OOB communication link may be different from the communication link used by the information handling system to send the video frames to the sink information handling systems engaged in the video conferencing session.

Similarly, the AV processing instruction manager 341 may direct the video processing engine 380 to execute any other AV processing instruction modules to adjust the visual composition of the one or more video frames. For example, the AV processing instruction manager 341 may execute any AV processing instruction modules to adjust the color blending/matching within a video frame, conduct outline detection within the video frames, adjust the luminance/brightness blending within the video frame, and generate a virtual background blur within the video frame, among other image modifications used to increase the visual composition of the video frames.

In an embodiment, the HOP heat map may be used to facilitate the execution of other AV processing instruction modules. For example, a boundary detection AV processing instruction module may be executed by the video processing engine 380 in order to detect a boundary between the user's image in a video frame and a background behind the user. Because the HOP heat map includes, among other data, data associated with the HOP video frame slice group that includes which video frame slices include a portion or the user's body. As such, the video processing engine 380 may limit or focus the application of the boundary detection processing instruction module to those video slices within the HOP video frame slice group. In another embodiment, the HOP heat map may be used to facilitate the execution of a face framing AV processing instruction module by, again, limiting the number of slices or focusing the slices to which the application of the face framing AV processing instruction module is made by the video processing engine 380 to detect a face/head of a user for framing within the videoframe. Similar advantages may be realized when the video processing engine 380 executes any of a face detection AV processing instruction module, a gaze detection AV processing instruction module, among other AV processing instruction modules by assisting in locating the user's image within the video frames. The execution of these other AV processing instruction modules may further assist with other post-processing processes such as with the generation of a virtual background.

As described herein, the multimedia processing control API 325 may operate, at least in part, as a hub to facilitate communication between various hardware, firmware, and software applications operating at information handling system. As another example of this, the multimedia processing control API 325 may receive software performance metrics generated at a diagnostic analysis application, for example, describing applications available or running, number of videoconference participants, CPU usage or load, as well as a breakdown of the CPU usage attributable to each of a plurality of applications (e.g., including a MMCA) running via the operating system of the information handling system. The multimedia processing control API 325 may forward these software performance metrics to the AV processing instruction manager 341, in an embodiment, to determine if and when to offload execution of the user presence detection system to an alternative processor in the information handling system. Although the processes described in connection with the execution of the video frame user presence detection module 381 by the AV processing instruction manager 341 may reduce the consumption of processing resources at any given processing device, the AV processing instruction manager 341 may still offload these processes to other processors (e.g., GPU, VPU, GNA, CPUs) to allow the AV processing instruction manager 341 to conduct other processes.

Figure 4:
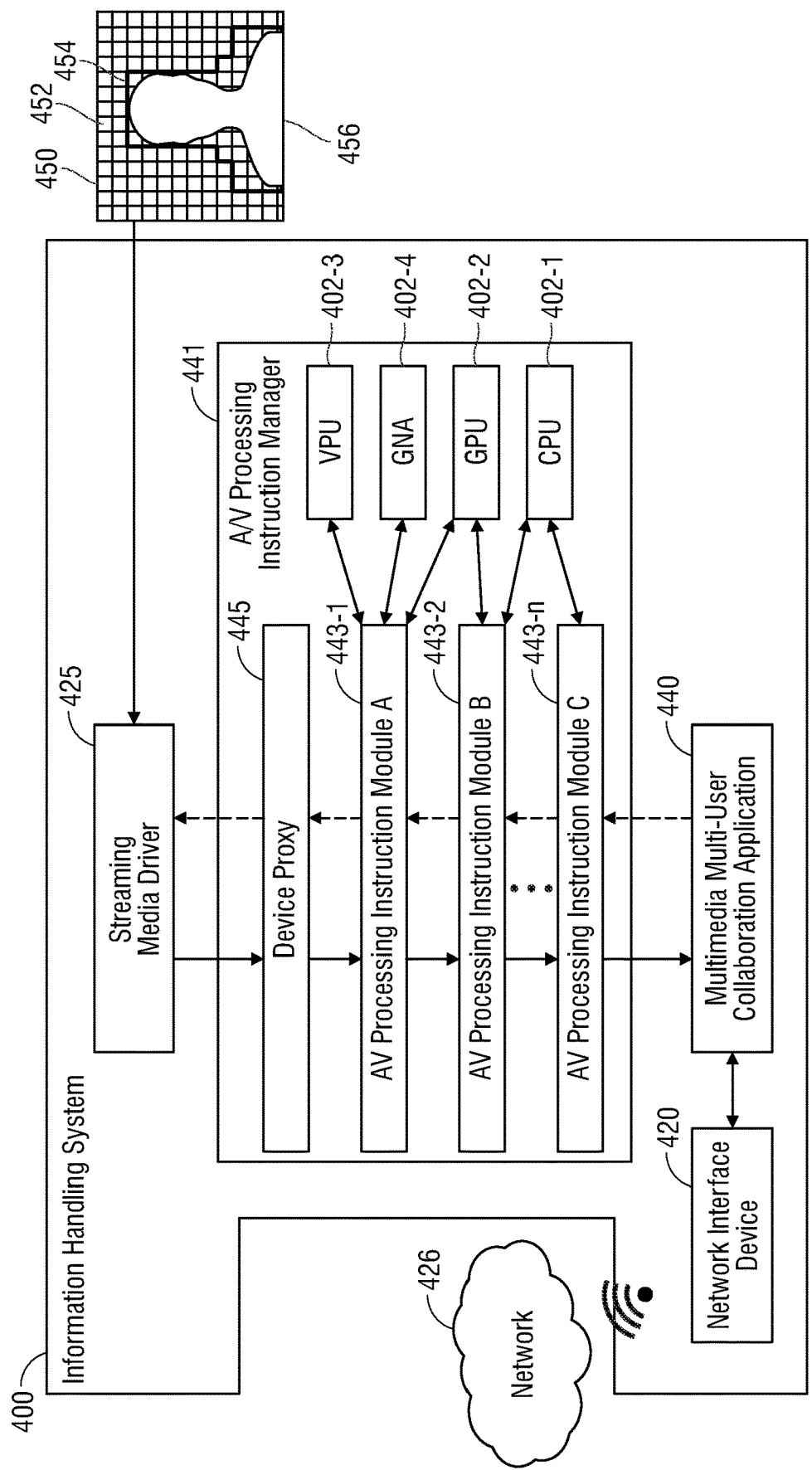
FIG. 4 is a block diagram illustrating audio/visual (AV) processing instruction manager for optimizing information handling system operation of a multimedia, multi-user collaboration application according to an embodiment of the present disclosure.

FIG. 4 is a block diagram illustrating audio/visual (AV) processing instruction manager 441 for optimizing information handling system operation of a MICA according to an embodiment of the present disclosure. FIG. 4 shows an AV processing instruction manager 441 interacting with a streaming media driver 425 and MICA 440 according to an embodiment of the present disclosure. FIG. 4 further shows an example video frame 450 being presented to the streaming media driver. Although FIG. 4 shows a single example video frame 450, the present specification contemplates that this video frame 450 is one of a plurality of video frames 450 received at and streamed by the streaming media driver 425.

As described herein, the AV processing instruction manager 441 may cause one or more AV processing instruction modules to create, implement, and transmit data regarding a HOP heat map and delta HOP heat map. As described herein, the AV processing instruction manager 441 may form part of a user's information handling system. In another embodiment, the processes and hardware associated with the AV processing instruction manager 441 may be remote from the information handling system in a distributed processing scenario allowing the information handling system to be a thin client device.

As described herein, the AV processing instruction manager 441 may direct the application of a video frame user presence detection module 381 and any other number of AV processing instruction modules to each video frame 450 produced by the camera and passed to the AV processing instruction manager 441 during the video conference session. In the embodiment shown in FIG. 4, these AV processing instruction modules may be chained together that successively processes the video frames 450 before those video frames 450 are sent to the MICA 440 and presented to the users engaged in the video conference session. The AV processing instruction manager 441 may include a device proxy 445. The device proxy 445 may be any device that, in an embodiment, uses resources other than a main central processing unit (CPU) such as a GPU, a VPU, GNA, among others. In an embodiment, the device proxy 445 may route or map connections between physical pins of the streaming media driver 425 (or other drivers) and the AV processing instruction manager 441.

With the device proxy 445, the AV processing instruction manager 441 may apply a number of AV processing instruction modules 443-1, 443-2, 443-n (e.g., AV processing instructions A, B, and C, respectively) including the video frame user presence detection module (FIG. 3, 381). The AV processing instruction modules 443-1, 443-2, 443-n may include any sets of instructions defined by any number of the AV processing instruction modules used to manipulate the data associated with each of the video frames 450 as described herein. These AV processing instruction modules may include a video frame user presence detection module, an unusual motion detection processing instruction module, an encoding processing instruction module, and a decoding processing instruction module as described herein among others.

The information handling system 400 in an embodiment may include a plurality of processors, including, for example, a central processing unit (CPU) 402-1, a graphics processing unit (GPU) 402-2, a visual processing unit 402-3, and a gaussian neural accelerator (GNA) 402-4. The CPU 402-1 in an embodiment may execute the bulk of tasks relating to all software applications running via the operating system (OS), which may include the MMCA 440, the MFPIP incorporating the AV processing instruction manager 441, as well as several others. Increased processing load placed on the CPU 402-1 by the AV processing instruction manager 441 during execution of a user session for the MMCA 440 may decrease the processing resources left available for all other applications also running at the OS, which may include word processing applications (e.g., Microsoft® Word®), presentation applications (e.g., Microsoft (ID PowerPoint®), e-mail applications, web browsers, and other applications routinely used in conjunction with the multimedia multi-user collaboration application throughout a typical workday.

The GPU 402-2 in an embodiment may be a processor specialized for rapidly manipulating and altering memory to accelerate the creation of a video sample using a plurality of captures images stored in a frame buffer. GPU 402-2 may be more efficient at manipulating such stored video samples during image processing performed by one or more of the AV processing instruction modules (e.g., 443-1, 443-2, and 443-*n*) such as the video frame user presence detection module, the unusual motion detection processing instruction module, the encoding processing instruction module, and decoding processing instruction module in the embodiments described herein. The VPU 402-3 in an embodiment may be specialized for running machine vision algorithms such as convolutional neural networks (e.g., as used by color blending/matching AV processing instruction modules, luminance/brightness blending AV processing instruction modules, outline detection AV processing instruction modules, facial lighting correction AV processing instruction modules, and virtual background blur AV processing instruction, for example). The GNA 414 in an embodiment may comprise low-power co-processor to the CPU, or a System on a Chip (SoC) that can run under very low-power conditions to perform a specialized task, such as real-time translations ongoing conversations, or various other audio and video processing methods represented by any one of the AV processing instruction modules 443-1, 443-2, or 443-*n*. The GNA 414 may operate in an embodiment to offload continuous inference workloads from the CPU 402-1, GPU 402-2, or VPU 402-3, including but not limited to noise reduction or speech recognition, to save power and free CPU 402-1 resources.

Each of the AV processing instruction modules (e.g., 443-1, 443-2, and 443-*n*) in an embodiment may be sets of algorithms or code instructions executed via the operating system (OS), using one of the processors of the information handling system 400 for modification of video data or audio data relating to streaming video conferencing applications. It is understood that any number of AV processing instruction modules is contemplated in discussing 443-1 through 443-*n*. A single processor may execute each of the AV processing instruction modules (e.g., 443-1, 443-2, and 443-*n*), a subgroup thereof, or may even execute a single AV processing instruction, according to various embodiments. The AV processing instruction manager 441 in an embodiment may determine which processor to access in order to execute each AV processing instruction modules (e.g., 443-1, 443-2, and 443-*n*) in an embodiment, based on offload instructions received at the AV processing instruction manager 441 in some embodiments. For example, in an embodiment in which the information handling system 400 acts as the media source, the AV processing instruction manager 441 may access the VPU 402-3 or the GNA 402-4 to execute various video or audio processing algorithms supported by the features of the MMCA, as represented by AV processing instruction module A 443-1, pursuant to an offload instruction to avoid executing that AV processing instruction using the GPU 402-2 or CPU 402-1. As another example in such an embodiment, the AV processing instruction manager 441 may access the GPU 402-2 or CPU 402-1 to execute the audio or video compression algorithm represented by AV processing instruction module C 443-*n*. In yet another example in such an embodiment, the AV processing instruction manager 441 may access CPU 402-1 to multiplex the processed and encoded audio and video samples into a processed and encoded media sample.

In another example embodiment in which the information handling system 400 acts as the AV media sink, to receive AV media samples captured at a remotely located information handling system, the AV processing instruction manager 441 may offload execution of the audio or video decompression algorithm represented by AV processing instruction module C 443-*n* (e.g., decoding processing instruction module 384, FIG. 3) to the GPU 402-2. In another example of such an embodiment, the AV processing instruction manager 441 may offload execution of various video or audio processing algorithms supported by the features of the MMCA, as represented by AV processing instruction module B 443-2 to the GPU 402-2, GNA 402-4, or VPU 402-3. In such a way, the AV processing instruction manager 441 may retrieve audio and video samples from an external media source information handling system and perform one or more processing methods on the retrieved audio and video samples in accordance with offload instructions received at the AV processing instruction manager 441.

During operation, the streaming media driver 425 may be executed by a processor of the information handling system to distribute the video frames 450, in this embodiment, to the AV processing instruction manager 441. The AV processing instruction manager 441 may direct the execution and application of each of the AV processing instruction modules 443-1, 443-2, 443-*n* to each of the video frames 450. The AV processing instruction manager 441 may cause one or more of the AV processing instruction modules 443-1, 443-2, 443-*n* to be applied to the video frames 450 in series and may, in an embodiment, cause the reapplication of these AV processing instruction modules 443-1, 443-2, 443-*n* to each of the video frames 450. In an embodiment, any of the video frame user presence detection module, unusual motion detection processing instruction module, encoding processing instruction module, and decoding processing instruction module as the AV processing instruction modules 443-1, 443-2, 443-*n* may, when executed, require additional modification by a previously applied AV processing instruction modules 443-1, 443-2, 443-*n* in order to create the HOP heat map and delta HOP heat map.

By way of example, the AV processing instruction manager 441 may cause a video frame user presence detection module to be executed. As described herein, the execution of the video frame user presence detection module causes a processor (401-1, 401-2, 401-3, 401-4) to slice a video frame 450 into a plurality of video frame slices 452 and based on the distance data, create a human object presence (HOP) heat map and assign a probability of the presence of the user's body within each video frame slice 452 of the video frame 450. The execution of the video frame user presence detection module may also cause the processor to select, among the plurality of video frame slices 452, those video frame slices 452 with an assigned probability of presence of the user's body 456 that exceeds a threshold and create a HOP video frame slice group 454 where the user's body 456 appears within the video frame 450 as described herein.

Because the video frame slices 452 have been bifurcated into two groups, the HOP video frame slice group 454 and any other slice not included in that group, the AV processing instruction manager 441 may further execute an encoding processing instruction module that encodes these two groups of slices differently. For example, the execution of the encoding processing instruction module by the AV processing instruction manager 441 causes the HOP video frame slice group 454 to be encoded by a first encoding algorithm. Additionally, execution of the encoding processing instruction module by the AV processing instruction manager 441 causes those frame slices not part of the HOP video frame slice group 454 to be encoded using a second encoding algorithm having a lower computational burden than the first encoding algorithm. This creates encoding data that, when transmitted to a sink information handling system, allows for relatively quicker decoding of the video frame 450 due to less processing resources consumed. Similarly, because all video frames 450 are to be encoded prior to transmission to sink information handling systems, the encoding processes at the information handling system consumes less processing resources due to the second encoding algorithm having a lower computational burden than the first encoding algorithm.

With the video frames 450 changed or augmented by these AV processing instruction modules 443-1, 443-2, 443-n, each video frame 450 may be transmitted to the MMCA 440 used to engage the user in a video conference session. The MMCA 440 may then transmit these video frames 450 to a network 426 via, for example, a network interface device 420. The network 426 may include a server or other network device that allows other users engaged in the video conference session to view these frames. As described herein, the data associated with the HOP heat map and its HOP video frame slice group 454 as well as the data associated with the delta HOP heat map may be sent to the sink information handling systems before or concurrently with the video frames 450 being sent. This amount of data describing the HOP heat map and its HOP video frame slice group 454 have a relatively low bit rate. In an embodiment a new HOP heat map may not need to be coordinated in timing either with every video frame since successive video frames are unlikely to change too drastically from video frame to video frame. Thus, the HOP heat map may be used to update this data, via the OOB communication link for example, for every few video frames (e.g., every 2 to 3 frames), and that may be sufficient for decoding of the video frames at a sink information handling system.

In an embodiment, the data associated with the HOP heat map and its HOP video frame slice group 454 as well as the data associated with the delta HOP heat map may be sent using an OOB communication method over an OOB communication link. In an embodiment, the OOB communication link may be different from the communication link used by the information handling system to send the video frames 450 to the sink information handling systems engaged in the video conferencing session.

The AV processing instruction manager 441 may also cause an unusual motion detection processing instruction module 382 to be executed by a processor (401-1, 401-2, 401-3, 401-4) in one optional embodiment. The execution of the unusual motion detection processing instruction module causes the AV processing instruction manager 441 to review, over a plurality of video frames 450, any changes to the position of the HOP video frame slice group 454. This creates, as described herein, a delta HOP heat map. The delta HOP heat map may, therefor, describe changes in position of the human image within the plurality of video frame slices 452 over a plurality of video frames captured by the video camera. In this embodiment, the HOP video frame slice group 454 may change location and size within any given video frame 450 presented at the MFPIP. This delta HOP heat map may describe these changes as the user, for example, moves left, right, forward, or backwards during the video conferencing session. The delta HOP heat map for subsequent video frames may be transmitted or used after an initial HOP heat map and HOP slice group has been transmitted for a first video frame. The delta HOP heat map is used to further reduce data transmitted to a sink information handling system. In an embodiment, the OOB communication described herein may send the data defining the HOP heat map and the HOP video frame slice group or the delta HOP heat map.

As described herein, the AV processing instruction manager 441 may be a processor that, in an embodiment, offloads the processing to other types of processing devices such as a GPU, GNA, dedicated CPU, VPU, among others. In an embodiment, the processor may be used during this offload processes used to apply the AV processing instruction modules 443-1, 443-2, 443-n to these devices so that the processor may execute other process such as a word processing application, a visual presentation program or the like in order to better engage with the other users engaged in the video conference session.

Figure 5:
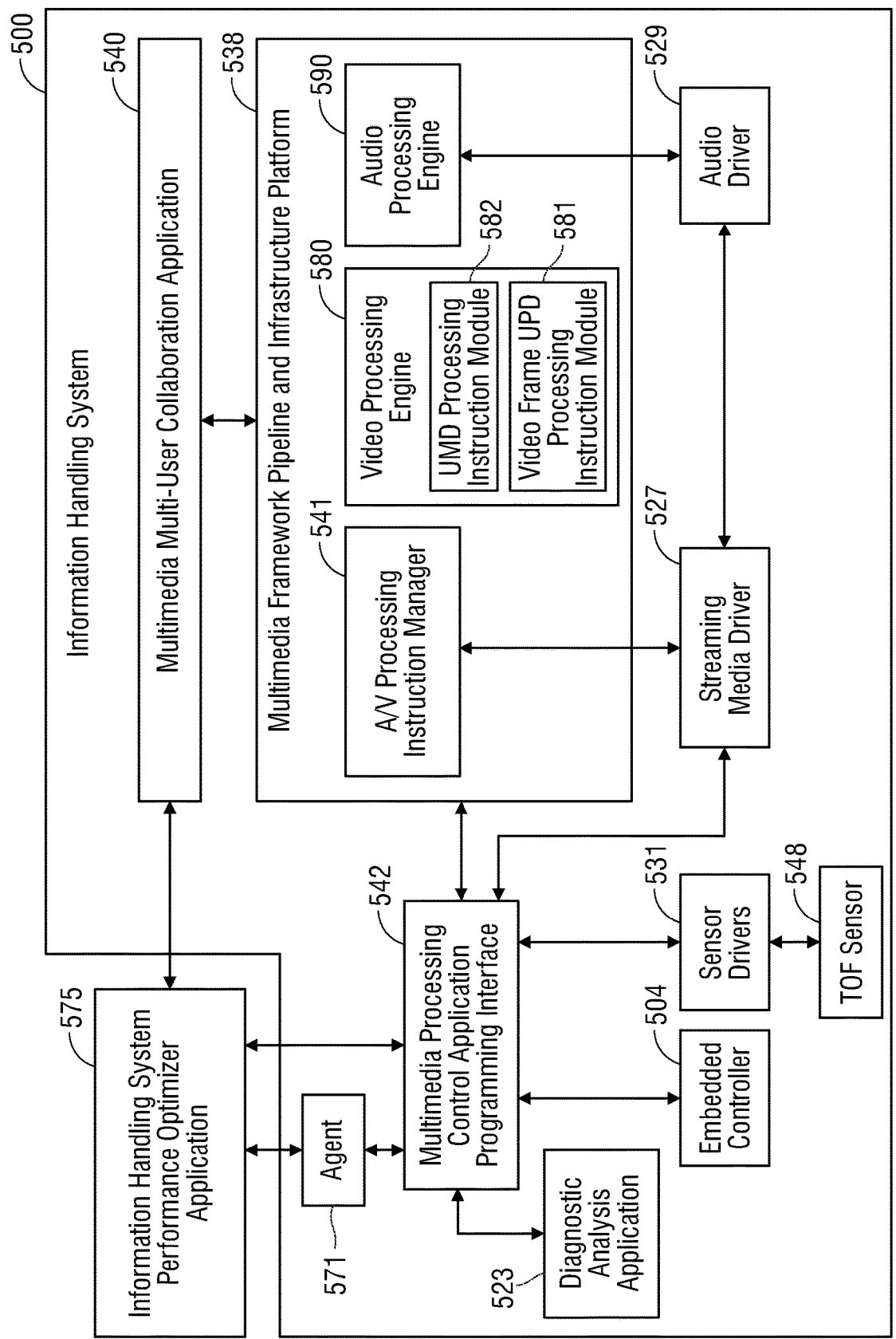
FIG. 5 is a block diagram illustrating a first embodiment of a video frame user presence detection system for optimizing information handling system operation of a multimedia, multi-user collaboration application according to an embodiment of the present disclosure.

FIG. 5 is a block diagram illustrating an information handling system 500 according to another embodiment of the present disclosure. FIG. 5 shows the interactions between the different hardware, software, and firmware components of the information handling system 500 relative to an information handling system performance optimizer application 575.

In an embodiment, the information handling system performance optimizer application 575 may be an application executed remote from the information handling system 500 such that the user may relay data associated with the HOP heat map and its HOP video frame slice group over, for example, a network. In an embodiment, the information handling system performance optimizer application 575 may form part of a multimedia multi-user collaboration application (MMCA) not native to the information handling system 500. In this embodiment, the MMCA may be a web-based application that provides the services described herein to multiple users over a network. The information handling system performance optimizer application 575 may receive any of the data associated with the HOP heat map and its HOP video frame slice group as well as any data associated with a delta HOP heat map from any of the information handling systems engaged in the video conferencing session and relay that data to an appropriate sink information handling system.

In an embodiment, the information handling system performance optimizer application 575 may operate to manage security credentials, connectivity credentials, performance optimization, software updates, and other various routine computing maintenance tasks for a plurality of information handling systems (e.g., including 500) owned by an enterprise business or produced by a single manufacturer. The Dell® Optimizer® software application is one example of such an information handling system performance optimizer application. The information handling system performance optimizer application in such an embodiment may communicate with the embedded controller 504 to receive high-level hardware performance metrics from each of the plurality of information handling systems (e.g., including 500) it manages during routine out-of-band communications between the information handling system performance optimizer application and all managed information handling systems. Such out-of-band (OOB) communications with the embedded controller 504 in an embodiment may be used to check security credentials or performance statistics for the information handling systems (e.g., 500), or to push software or firmware updates to the information handling systems, for example. During such routine maintenance, the information handling system performance optimizer application may accumulate, sort, and analyze all performance metrics received from all managed information handling systems (e.g., 500). OOB communications initiated in such a way between the embedded controller 204 and the information handling system performance optimizer application may be via a wireless network such as Wi-Fi or cellular, or via wired connection. Such OOB communications operate without need for operating system (OS) intervention or function and may operate behind the scenes to ensure optimized function for managed information handling systems. In a specific embodiment, the OOB communications executed by the embedded controller 504 may relay that data associated with the HOP heat map and its HOP video frame slice group as well as, in an embodiment, data associated with the delta HOP heat map to other sink information handling systems to facilitate the decoding of a video frame as described herein.

The MFPIP 538 may include audio or video processing systems of the information handling system 500 or that, per the execution of the video processing engine 580, applies any number of AV processing instruction modules to each of the video frames created as the video camera (e.g., webcam) provides those video frames to the video conference session executed by the MMCA 540. In an embodiment, the MFPIP 538 receives a stream of video frames and executes a number of AV processing instruction modules including a video frame user presence detection processing instruction module 581, an unusual motion detection AV processing instruction module 582, as well as the encoding processing instruction module and decoding processing instruction module as described herein. The video processing engine 580 may direct the application of the AV processing instruction modules described herein to each video frame produced by the camera and passed to the video processing engine 580 during the video conference session. In the embodiment shown in FIG. 4, these AV processing instruction modules may be chained together that successively processes the video frames before those video frames are sent to a sink information handling system.

Execution of the video frame user presence detection processing instruction module 581 may generate the HOP heat map and HOP video frame slice group according to the embodiments described herein and in coordination with a distance sensor. The execution of the unusual processing instruction module 582 may generate the optional delta HOP heat map based on detected movement of the user by a distance sensor (e.g., TOF sensor) according to the embodiments described herein.

The information handling system 500 described with reference to FIG. 5 may represent a transmitting, media source information handling system or a receiving, media sink information handling system in various embodiments. In still other embodiments, information handling system 500 may operate as both a transmitting, media source information handling system and a receiving, media sink information handling system, as may be the case for an information handling system transmitting video of one participant user while simultaneously executing code instructions for the multimedia multi-user collaboration application 550 to display videos of other participants within a shared user session of a video conferencing system.

As described, IHSPO 575, in an embodiment, may operate remotely from the information handling system 500 in an embodiment. For example, the IHSPO 575 may operate on a server, blade, rack, or cloud-based network maintained and controlled by the manufacturer of several information handling systems, or managed by an employer or enterprise owner of several information handling systems, including information handling system 500. In such an embodiment, the information handling system performance optimizer application 575 may operate to monitor certain performance metrics at each of the plurality of such information handling systems (e.g., including 500), perform firmware and software updates, confirm security credentials and compliance, and manage user access across the plurality of information handling systems (e.g., as owned by an employer or enterprise corporation, and including 500).

The multimedia processing control API 542 in an embodiment may operate, at least in part, as a hub, facilitating communication of each of the data associated with the HOP heat map and its HOP video frame slice group as well as the delta HOP heat map, media capture instructions, and various sensor readings to the IHSPO 575, or agent 571 thereof. For example, processed video frames by the MFPIP 538 and the AV processing instruction manager may be directed by the IHSPO 575 to be sent over a dedicated OOB communication link in order to facilitate any sink information handling system in the decoding processes conducted via the execution of a decoding processing instruction module by an AV processing instruction manager as described herein.

In other embodiments, the IHSPO 575 may be in direct communication with the embedded controller 504 via these out-of-band communications. In such embodiments, the data associated with the HOP heat map and its HOP video frame slice group as well as the delta HOP heat map may be acquired from the AV processing instruction manager by the embedded controller 504 in kernel mode and communicated to the IHSPO 575 directly during routine out-of-band communications between the IHSPO 575 and all managed information handling systems (e.g., including 500). Such out-of-band communications with the embedded controller 504 in an embodiment may be used to facilitate the transmission of the data associated with the HOP heat map and its HOP video frame slice group as well as the delta HOP heat map. Out-of-band communications initiated in such a way between the embedded controller 504 and the IHSPO 575 may be via a wireless network such as Wi-Fi or cellular, or via wired connection.

In an embodiment, software performance metrics may be generated at a diagnostic analysis application 523, based at least in part on communication between the diagnostic analysis application 523 and the processor of the information handling system 500. Such a diagnostic analysis application 523 may operate to gather metrics describing CPU usage or load, as well as a breakdown of the CPU usage attributable to each of a plurality of applications (e.g., including a multimedia multi-user collaboration application) running via the operating system of the information handling system 200. In some embodiments, the diagnostic analysis application 523 may provide similar metrics for other types of processors for the information handling system, including, for example, a graphics processing unit (GPU), visual processing unit (VPU), or gaussian neural accelerator (GNA). One example of such a diagnostic analysis application 523 in an embodiment may include the Microsoft® Diagnostic Data Viewer® software application. In an embodiment, these software performance metrics may be generated at the diagnostic analysis application 523 and transmitted to the AV processing instruction manager via the multimedia processing controller API 542.

The information handling system 500 in FIG. 5 shows an MMCA 540 that is executable by a processor of the information handling system 500 in an embodiment. In an embodiment, the MMCA may be executed by the IHSPO 575 as a web-based application for a plurality of information handling systems.

Similar to above, the information handling system 500 may be powered on via use of an on switch and a PMU. The PMU may power on an embedded controller 504 and any processors that, in an embodiment, execute a basic input/output system (BIOS) and, in an embodiment, an operating system (OS).

In an embodiment, during operation of the information handling system 500, a trained neural network may be used to receive a number of inputs in the form of AV processing instruction modules that have been enabled as well as sensor data. The data associated with these selections and sensor data is used as input to a trained neural network to provide, as output, optimized output settings that adjusts any AV processing instruction modules such as the video frame user presence detection module, the unusual motion detection processing instruction module, the encoding processing instruction module, and the decoding processing instruction module as well as any other AV processing instruction module that for example, corrects any visual component of the video frame such as the background lighting, color blending/matching, luminance/brightness blending, outline detection, facial lighting correction, and virtual background blur within each video frame. Each of these AV processing instruction modules, when executed by the processor, adjusts those video frames as described herein.

FIG. 5 further shows that the adjustments to the visual composition of the video frames may be facilitated through the use of a number of sensors such as a camera and other sensors or sensor array. In an embodiment, the sensors may include an TOF sensor 548. The TOF sensor 548 may be used to provide distance data descriptive of the distance between a user's body, or any background object, and the video camera of the information handling system. This TOF sensor 548 may help inform, as input, as to how to distinguish between a human object and a non-human object in the video frames. As described herein, the TOF sensor 548, along with the camera, may be used to provide data to the processor in order to define the HOP heat map via the video frame UPD processing module 581 or delta HOP heat map via the UMD processing instruction module 582. The TOF sensor 548 may include a sensor driver 531 used by the hardware to interface the hardware with the operating system of the information handling system 500. During these operations, a number of drivers associated with the streaming media driver 527 may be executed by the processor to enable an OS of the information handling system 500 and other computer programs to access hardware functions of the input/output devices, sensors, and the video camera, among others.

The audio driver 529 may be in communication with the AV processing instruction manager such that audio samples received by the audio driver 529 may be transmitted to an AV processing instruction manager 541 (e.g., via the audio processing engine, or via the streaming media driver, for example) in an embodiment. In such a way, the AV processing instruction manager 541 may direct retrieval of a video sample captured at a camera operably connected to information handling system 500 and retrieval of an audio sample captured at a microphone operably connected to information handling system 500.

As described herein, the streaming media driver 527 in such an embodiment may receive video or audio samples captured by peripheral cameras or microphones in communication therewith, according to default or optimized media capture instructions. In another embodiment, the audio driver 529 may receive audio samples captured by the microphone, for example, in communication therewith, according to such received media capture instructions. In such an embodiment, the audio driver 529 may operate as a mini-driver or child device to the parent device streaming media driver 527. The streaming media device driver 527 may be in communication with an AV processing instruction manager 541 via one or more ports (e.g., as described in greater detail with respect to the of FIG. 4) such that video or audio samples received by the streaming media device driver 527 may be transmitted to an AV processing instruction manager 541, in an embodiment. The audio driver 529 may be in communication with the AV processing instruction manager such that audio samples received by the audio driver 529 may be transmitted to the AV processing instruction manager (e.g., via the audio processing engine, or via the streaming media driver, for example) in an embodiment. In such a way, the AV processing instruction manager may direct retrieval of a video sample captured at a camera operably connected to information handling system 500 and retrieval of an audio sample captured at a microphone operably connected to information handling system 500.

Figure 6:
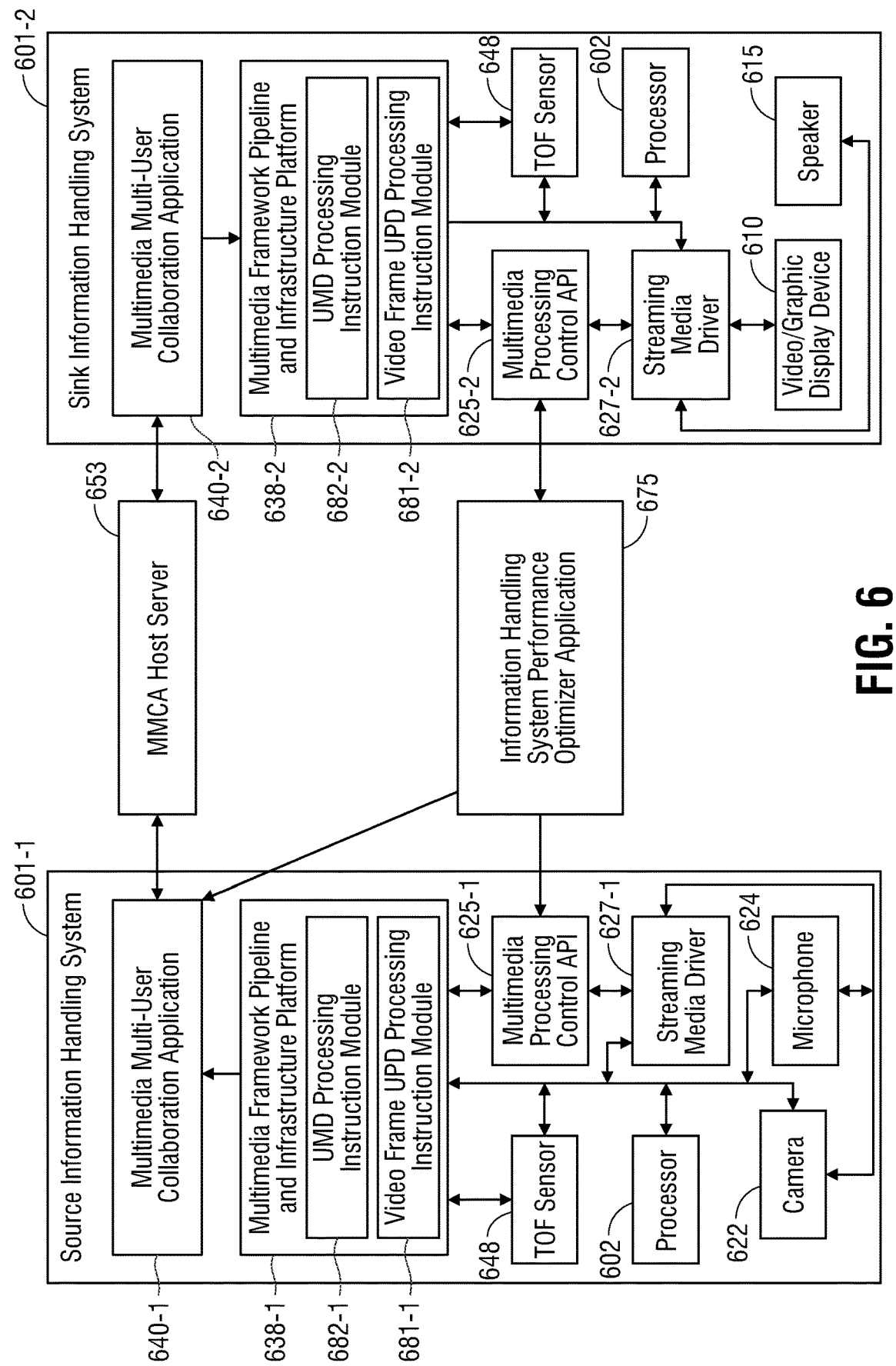
FIG. 6 is a block diagram illustrating another embodiment of a video frame user presence detection system operation of a multimedia multi-user collaboration application according to an embodiment of the present disclosure.

FIG. 6 is a block diagram illustrating another embodiment of system for optimizing information handling system operation of an MMCA according to an embodiment of the present disclosure. User sessions may be hosted and coordinated by a multimedia multi-user collaboration application host server 653 located remotely from, but in communication with one or more source information handling systems (e.g., 601-1) and one or more sink information handling systems (e.g., 601-2) via a network.

In an embodiment, the operations and processes conducted by the source information handling system 601-1 may be similar to those of the sink information handling system 601-1. Because the source information handling system 601-1 and sink information handling system 601-1 are engaged in the execution of an MMCA 640-1, 640-2 and participating in a video conference session, each of the source information handling system 601-1 and sink information handling system 601-2 are sending and receiving video frames among each other so that each user of the source information handling system 601-1 and sink information handling system 601-2 can view and hear, in real-time, the image and sounds produced by the other user. Therefore, the present specifications contemplate that the source information handling system 601-1 and sink information handling system 601-2 may perform concurrently those processes of the other at any given time.

As described herein, the source information handling system 601-1 and sink information handling system 601-2 each include a MMCA 640-1, 640-2. The MMCA 640-1, 640-2 may be any application that, when executed by the processor 602-1, 602-2, initiate a video conference session between a plurality of users such as between the user of the source information handling system 601-1 and the sink information handling system 601-2. With the MMCA 640-1, 640-2 and per the user selections, the MMCA 640-1, 640-2 may present each video frame to the user at a respective video/graphic display device. In an embodiment, the MMCA host server 653 may operatively couple the source information handling system and sink information handling system to facilitate the operation of the video conference session. The MMCA host server 653 may also provide certain services such as video conferencing session recording storage as well as manage secure access to access the video conferencing session, scheduling, and network linking of participants. Examples of a MMCA 640-1, 640-2 may include Zoom® developed by Zoom Video Communications, Skype® developed by Skype Technologies of Microsoft, Microsoft Teams® by Microsoft, WebEx® developed by Cisco, GoToMeeting® developed by LogMeIn, among others.

The MFPIPs 638-1, 638-2 may include audio or video processing system of the source information handling system 601-1 or sink information handling system 601-2 that applies any number of AV processing instruction modules the each of the video frames created as the video camera (e.g., webcam) provides those video frames to the video conference session executed by the MMCA 640-1, 640-2. In an embodiment, the MFPIP 638-1, 638-2 receives a stream of video frames and, via application of these AV processing instruction modules such as the video frame user presence detection (UPD) processing instruction module 681-1, 681-2 or unusual movement detection (UMD) processing instruction module 682-1, 682-2, creates the HOP heat map, HOP video frame slice group, or optionally delta HOP heat maps according to several embodiments as described herein.

Each of the source information handling system 601-1 and sink information handling system 601-2 may include a streaming media driver 627-1, 627-2. As described herein, the streaming media driver 527 in such an embodiment may receive video or audio samples captured by peripheral cameras or microphones in communication therewith, according to default or optimized media capture instructions. In another embodiment, the audio driver may receive audio samples captured by the microphone, for example, in communication therewith, according to such received media capture instructions. In such an embodiment, the audio driver may operate as a mini-driver or child device to the parent device streaming media device driver 627-1, 627-2. The streaming media device driver 627-1, 627-2 may be in communication with an AV processing instruction manager via one or more ports (e.g., as described in greater detail with respect to the of FIG. 4) such that video or audio samples received by the streaming media device driver 627-1, 627-2 may be transmitted to an AV processing instruction manager, in an embodiment. The audio driver may be in communication with the AV processing instruction manager such that audio samples received by the audio driver may be transmitted to the AV processing instruction manager (e.g., via the audio processing engine, or via the streaming media driver, for example) in an embodiment. In such a way, the AV processing instruction manager may direct retrieval of a video sample captured at a camera operably connected to information handling system and retrieval of an audio sample captured at a microphone operably connected to information handling system 500.

The source information handling system 601-1 and sink information handling system 601-2 may further include a MPCAPI 625-1, 625-2. The MPCAPI 625-1, 625-2 in an embodiment may operate to facilitate communication between various applications, controllers, and drivers of the information handling system in an embodiment. For example, the MPCAPI 625-1, 625-2 may interface between a MFPIP 638-1, 638-2 and the sensors of the sensor array such as the video camera, the TOF sensors 648, among others.

In the embodiment, the source information handling system 601-1, as well as the sink information handling system 601-2, may include a microphone 624 used to receive sounds from the user and, with the audio driver 629 and other audio processing devices, create audio used to accompany the video output by the MMCA 640-1, 640-2. The source information handling system 601, as well as the sink information handling system 601-2, may include a camera 622 used to capture images of the users while engaged with the video conference session executed by the MMCA 640-1, 640-2.

Similar to FIG. 5 above, FIG. 6 shows the interactions between the different hardware, software, and firmware components of the source information handling system 601-1 and sink information handling system 601-2 relative to an information handling system performance optimizer application 675. In an embodiment, the information handling system performance optimizer application 675 may be an application executed remotely from the source information handling system 601-1 and sink information handling system 601-2 such that, in some embodiments, the data associated with the HOP heat map and its HOP video frame slice group or optionally the delta HOP heat map may be transmitted over, for example, a network and facilitated by the information handling system performance optimizer application 675. In an embodiment, the OOB communications between the source information handling system 601-1 and the sink information handling system 601-2 may be facilitated by the information handling system performance optimizer application 675 that may also participate in the video conference session via the MMCA host server 653. In an embodiment, the information handling system performance optimizer application 675 may form part of a MMCA not native to the information handling system 500. In this embodiment, the MMCA may be a web-based application that provides or helps to facilitate the services described herein to multiple users over a network.

In an alternative embodiment, an agent local to the source information handling system 601-1 or sink information handling system 601-2 can receive the data associated with the HOP heat map and its HOP video frame slice group as well as the delta HOP heat map. In this embodiment, the agent may be executed the locally in either or both of the source information handling system 601-1 or sink information handling system 601-2 in order to provide the data as described herein between the information handling systems.

During operation, the information handling system performance optimizer application 675 may be executed on the source information handling system 601-1 and sink information handling system 601-2 prior to or during the video conference session the users are engaged in. The information handling system performance optimizer application 675 may be executed locally on the source information handling system 601-1 or sink information handling system 601-2 or may be executed remotely as described herein.

The source information handling system 601-1 and sink information handling system 601-2 may include a video/ graphic display device 610. The video/graphic display device 610 in an embodiment may function as a liquid crystal display (LCD), an organic light emitting diode (OLED), a flat panel display, or a solid-state display. Other input/output devices include a speaker 615 and a microphone 624 that outputs audio to a user and captures audio samples from a user, respectively as described herein. Although FIG. 6 shows that the source information handling system 601-1 only includes a microphone 624 and camera 622 to capture audio input and images of the user, respectively, the present specification contemplates that the sink information handling system 601-2 also includes these input devices. Similarly, although FIG. 6 shows only the sink information handling system 601-2 including a speaker 615 and a video/graphic display device 610, the present specification contemplates that the source information handling system 601-1 also includes these input devices.

Figure 7:
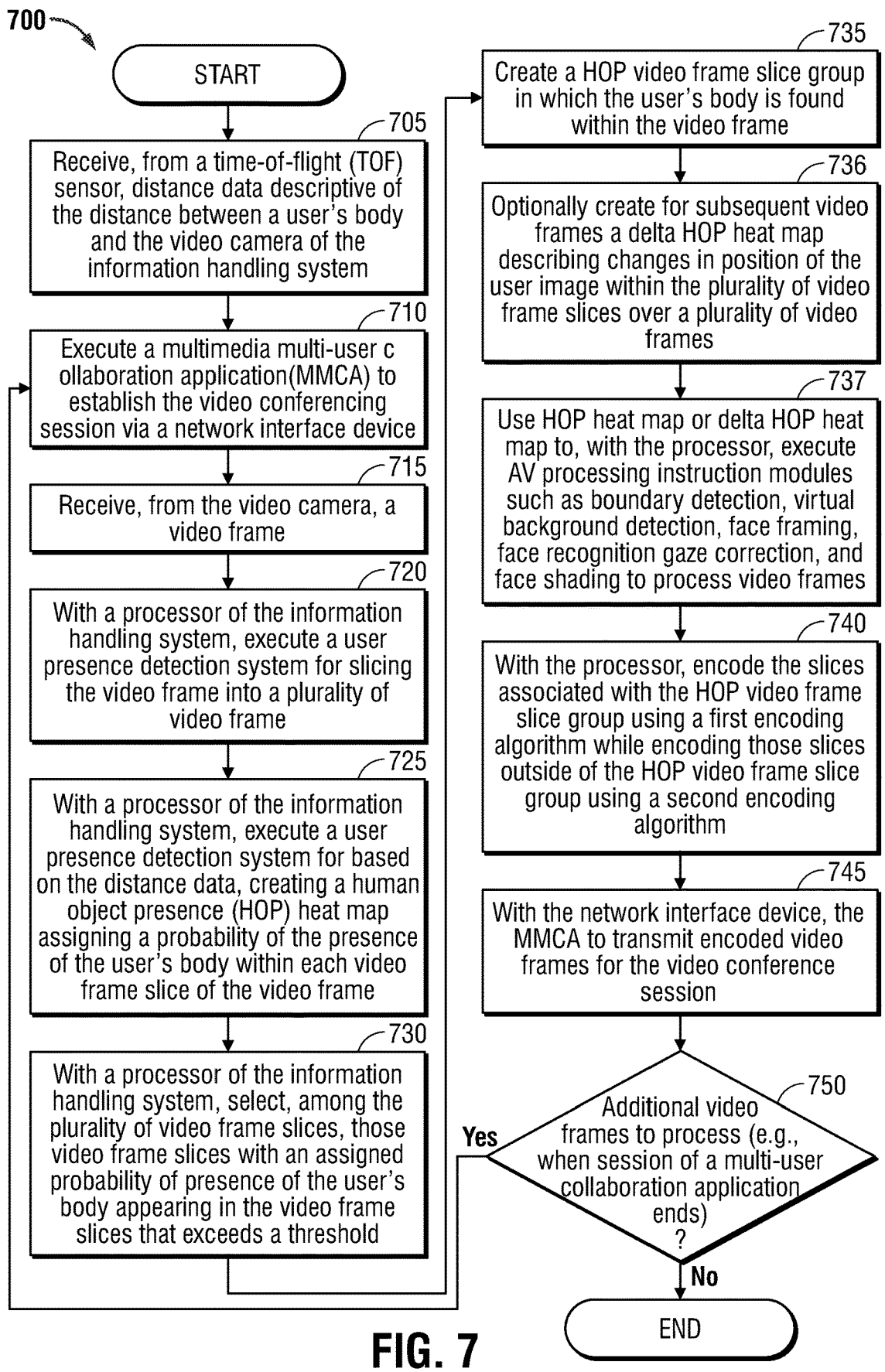
FIG. 7 is a flow diagram illustrating a method of reducing resource consumption at an information handling system during a video conferencing session according to an embodiment of the present disclosure.

FIG. 7 is a flow diagram illustrating a method 700 of reducing resource consumption at an information handling system during a video conferencing session according to an embodiment of the present disclosure. In particular, the method utilizes a proximity sensor to assist in generating a probability-based human object presence (HOP) heat map within slices of a vide frame. The HOP heat map is used to assist in computational determinization of a user image location and background in the video frame in an example embodiment during image processing of video frames to be transmitted via an MMCA. The method 700 may include, at block 705, receiving, from a time-of-flight (TOF) sensor, distance data descriptive of the distance between a user's body and the video camera of the information handling system. Although the present specification describes the distance data as being provided by a TOF sensor, the present specification contemplates that other types of sensors such as IR sensors and the like may be used to determine distance data of a user's body.

The method 700 may further include, at block 710, executing an MMCA to establish the video conferencing session via a network interface device. The MMCA may be any application that, when executed by the processor, initiates a video conference session between a plurality of users such as between the user of the information handling system and another remote user of another information handling system. MMCA may utilize an MMCA central facility server to engage in the video conference in an embodiment. With the MFPIP and MPCAPI, the MMCA may apply the MFPIP default settings for such processing, reprocessing, encoding, decoding, capture, and display of the video frames used to transmit outbound video frames or display inbound video frames to the user at the video/graphic display device during a video conference session. Examples of a MMCA may include Zoom® developed by Zoom Video Communications, Skype® developed by Skype Technologies of Microsoft, Microsoft Teams® by Microsoft, WebEx® developed by Cisco, GoToMeeting® developed by LogMeIn, among others.

The method 700 may further include receiving, from the video camera, one or more video frames at block 715. The streaming media driver, in an embodiment for example, may receive video or audio samples captured by peripheral video cameras (or microphones) in communication therewith, according to default or optimized media capture instructions. In an embodiment, an audio driver may also receive audio samples captured by the microphone in communication therewith, according to such received media capture instructions. In these embodiments, audio driver may operate as mini-driver or child device to the streaming media device driver. The streaming media device driver may be in communication with an AV processing instruction manager via one or more ports (e.g., as described in greater detail with respect to the of FIG. 4) such that video or audio samples received by the streaming media device driver may be transmitted to an AV processing instruction manager, in an embodiment. In such a way, the AV processing instruction manager may direct retrieval of a video sample captured at a video camera operably connected to information handling system and retrieval of an audio sample captured at a microphone operably connected to information handling system.

At block 720, the method 700 may further include, with a processor of the information handling system, executing a user presence detection system for slicing the video frame into a plurality of video frame slices. The user presence detection system described herein may be executed by, for example, an AV processing instruction manager directing the execution of a video frame user presence detection module associated with the user presence detection system as described herein. Upon execution of the video frame user presence detection module, the method 700 may continue at block 725 with creating a human object presence (HOP) heat map assigning a probability of the presence of the user's body within each video frame slice of the video frame. In an embodiment, the execution of the video frame user presence detection module or any other user presence detection system described herein, causes the processor (or a processor) to slice each video frame into a plurality of video frame slices. The number and position of the video frame slices created may be selected to most efficiently detect the presence and non-presence of a user within the video frame slice. The AV processing instruction manager may receive the distance data from the TOF sensor associated with or included with the video camera and, based on that distance data, create a HOP heat map. This HOP heat map may be used to determine which of the video frame slices the user's body or any portion of the user's body is present.

In an embodiment, to create the HOP heat map, the video frame UPD AV processing instruction module may be configured to assign a probability of the presence of the user's body within each video frame slice of the video frame. The video frame UPD AV processing instruction module may do this by executing a HOD algorithm that analyzes the distance data associated with each slice of the video frame and assigns an integer value of between 0 and 100, for example, and where a threshold integer value is met, a probability value is assigned to each slice of the video frame. For example, the distance data acquired within a first slice of a video frame may indicate that an object is about 610 mm (about 2 feet) from the video camera. Similarly, the distance data acquired within a second slice of a video frame may indicate that an object is about 1830 mm (about 6 feet) from the video camera. The execution of the HOD algorithm by the video frame UPD AV processing instruction module may determine that, in the context of the execution of the MMCA, the object that is about 610 mm from the video camera indicates a human is present and detected, at least, within the first slice of the video frame. The execution of the HOD algorithm may allow video frame UPD AV processing instruction module to make similar determinations with regard to the second slice of the video frame and, due to the significantly longer distances detected, the 1830 mm distances indicate a wall is present behind the user. In an embodiment, where no distance data is found for the second slice, this may indicate that the distance sensor cannot detect an object behind the user (e.g., any wall, if present, is too far behind the user to be detected) and video frame UPD AV processing instruction module executing the HOD algorithm may determine that the other slices (e.g., the first slice) includes a human image.

During execution of the HOD algorithm by the processor, in an embodiment, the distance data associated with each slice of the video frame may be compared to each other and the threshold distance may be calculated based on distance data among all of the slices of the video frames. In this embodiment, a scale may be created where the shortest distance data detected among all distance data in each slice of the video frame is assigned a highest value (e.g., 100) while the longest distance data detected among all distance data in each slice is assigned a lowest value (e.g., 0). In this embodiment, a distance value of, for example 51 assigned to the first slice of the video frame may indicate the presence of a human object within that first video frame when the threshold value is assigned to be 50. Thus, in this example embodiment, because the threshold value is set to 50 any object within any given slice falling in the range of 51-100 may be indicated by video frame UPD AV processing instruction module executing the HOD algorithm as being a human object while any object within any given slice falling in the range of 0-50 may not be indicated as being a human object.

In an alternative embodiment, the distance data associated with each slice of the video frame may be compared to each other and the threshold distance may be calculated based on distance data among all of the slices of the video frames using a different scale where the highest value is set to be the location of the video camera. In this embodiment, a scale may be created where the shortest distance data is not detected and instead the location of the video camera is assigned the highest value (e.g., 100). The video frame UPD AV processing instruction module executing the HOD algorithm may then assign the longest distance data detected among all distance data in each slice as the lowest value (e.g., 0). In this embodiment, a distance value of, for example 51 assigned to the first slice of the video frame may indicate the presence of a human object within that first video frame when the threshold value is assigned to be 50. Thus, in this example embodiment, because the threshold value is set to 50 any object within any given slice falling in the range of 51-100 may be indicated by the videoframe UPD AV processing instruction module executing the HOD algorithm as being a human object while any object within any given slice falling in the range of 0-50 may not be indicated as being a human object. In this embodiment, therefore, the distance between the video camera and a background of the user may be the initial scaling distance used to determine whether any intermediate objects such as parts of the user's body are detected.

In any scaling example described herein, the execution of the HOD algorithm by the video frame UPD AV processing instruction module, allows video frame UPD AV processing instruction module to assign a value or probability value to each slice of the video frame. Again, a probability threshold value may be assigned to each slice of the video frame indicating a probability of presence of the user's body within each respective slice. From this data, the HOP heat map is generated.

The method 700, at block 730, may continue with selecting, among the plurality of video frame slices, those video frame slices with an assigned probability of presence of the user's body appearing in the video frame slices that exceeds a threshold using the processor. In this embodiment, this selection of slices that include the user's body allows the method, at block 735 to designate a HOP video frame slice group that groups together each of those slices of the video frame where the presence of the user's body has been detected (e.g., distance data exceeds a threshold value). By grouping a number of slices together to create the HOP video frame slice group, the video frame UPD AV processing instruction module may determine where, within the video frame, the user's image resides. During video conferencing sessions, the user usually sits in front of the video camera anywhere from 2 to 3 feet from the video camera. As such, the video frame includes an image of the user's body (usually from the chest up) with a background behind the user. The image of the user may be considered the most important part of the video frame and, according to the embodiments described herein, may be encoded differently than those slices of the video frame that are not included as being part of the HOP video frame slice group. In one embodiment, the present specification contemplates an embodiment where a new HOP heat map and HOP video frame slice group is sent for every video frame sent by the source information handling system to the sink information handling system.

In an alternative embodiment at block 736, may continue with optionally creating, for subsequent video frames, a delta HOP heat map describing changes in position of the user image within the plurality of video frame slices over a plurality of video frames. As described herein, the creation of the delta HOP heat map may be done with a UMD AV instruction processing module so that a new HOP heat map is not sent with every video frame sent to the sink information handling system. Instead, the delta HOP heat map may be sent for any subsequent video frame so that the processing resources used to encode and decode the video frame may be further reduced and the data transmitted to describe the HOP heat map is also reduced. The delta HOP heat map may describe changes in position of the human image within the plurality of video frame slices over a plurality of video frames captured by the video camera. In a specific embodiment, the delta HOP heat map may include data descriptive of only those changes in the subsequent video frame as compared to the originally sent HOP heat map. The UMD AV instruction processing module may determine from a plurality of sequential frames that movement is occurring and direction of movement within the video frames and among the determined video frame slices. In this embodiment, the HOP video frame slice group may change location and size within any given video frame presented at the MFPIP. This delta HOP heat map may describe these changes as the user, for example, moves left, right, forward, or backwards during the video conferencing session. The delta HOP heat map and changes to the HOP video frame slice group will be generated in this embodiment for videoframes subsequent to a first video frame. The first video frame will be transmitted by a source information handling system with a first videoframe HOP heat map and HOP video frame slice group that serves as reference relative to later delta HOP heat map data generated and transmitted. Similar to the data associated with the HOP heat map and its HOP video frame slice group, the data associated with the delta HOP heat map may be sent to the sink information handling systems before or concurrently with the video frames being sent.

At block 740, the HOP heat map may also be used to facilitate operation of one or more post processing tasks that the video engine may perform on the captured video frames. The HOP heat map and HOP video frame slice group designation provides a fairly good indication of which slices of the video frame contain an image of the user's body and which slices do not and may comprise a background portion of the video frame. This information of the HOP heat map and HOP video frame slice group may be provided to one or more AV processing instruction module to process the video frames. For example, the HOP heat map and HOP video frame slice group may be provided to a boundary detection AV processing instruction module to identify slices of the video frame where focus of boundary detection algorithms, such as matting or segmentation, may be concentrated. This may reduce the computation burden of the boundary detection algorithm and reduce the area of the video frame that need to be processed. Other AV processing instruction modules also rely on identification of locations of the head, face, eyes, or body of the user in the videoframe images. For such AV processing instruction modules, the HOP heat map and HOP video frame slice group may assist in narrowing the slices of the videoframe that must be processed. Several such AV processing instruction modules are described in embodiments of the present disclosure.

The method 700 may include, with the processor, encoding the slices associated with the HOP video frame slice group using a first encoding algorithm while encoding those slices outside of the HOP video frame slice group using a second encoding algorithm at block 742. In an embodiment and prior to sending the HOP video frame slice group, the HOP video frame slice group may be encoded using a first encoding algorithm and upon execution of the encoding processing instruction module by the AV processing instruction manager. Additionally, those slices falling outside of the HOP video frame slice group may be encoded using a second encoding algorithm having a lower computational burden than the first encoding algorithm upon execution of the encoding processing instruction module by the AV processing instruction manager according to various embodiments described in the present disclosure. This allows the AV processing instruction manager to direct encode slices of the video frame differently such that processing resources are reserved while the visual composition of the user's image is not compromised. The first and second types of encoding used may be sent to the MMCA host server system or to the sink information handling system.

The method may include, at block 745, with the MMCA transmitting the encoded video frames for the video conference session to, for example, one or more sink information handling systems. This transmission may be facilitated through the operations of a network interface device and an MMCA host server system or systems. In an embodiment, in order to properly decode the encoded video frames, the sink information handling system may be provided with data associated with the HOP heat map and its HOP video frame slice group created by the Videoframe UPD AV processing instruction module. This data may include, among others, data describing the number of slices of the video frame, those slices that fall within the HOP video frame slice group, those slices the fell outside of the HOP video frame slice group (may be determined by default), the encoding algorithm used by the source information handling system to encode the HOP video frame slice group, and the encoding algorithm used by the source information handling system to encode the slices not present within the HOP video frame slice group. This process may be repeated for the series of video frames of a videoconferencing session. In another embodiment, the sink information handling system may be provided with data associated with the delta HOP heat map indicating changes HOP video frame slice group for subsequent video frames after a first video frame. The sink information handling system will then receive the updated information of the HOP video frame slice group slices for application of the second decoding algorithm in this embodiment. This data allows the sink information handling system to properly decode the video frame as the stream of video frames is sent to the sink information handling systems from the information handling system in either embodiment.

The data associated with the HOP heat map and its HOP video frame slice group may, in an embodiment, be sent to the sink information handling systems prior to or concurrently with the video frames associated with the HOP heat map and its HOP video frame slice group. In an embodiment, the number of HOP heat maps sent to the sink information handling system may be less than the number of video frames. In this embodiment, the In an embodiment, the data associated with the HOP heat map and its HOP video frame slice group may be sent to these sink information handling systems using an OOB communication method over an OOB communication link. In an embodiment, the OOB communication link may be different from the communication link used by the information handling system to send the video frames to the sink information handling systems engaged in the video conferencing session.

In an embodiment, the information handling system may also send to a sink information handling system data descriptive of a delta HOP heat map. The delta HOP heat map may describe changes in position of the human image within the plurality of video frame slices over a plurality of video frames captured by the video camera. In this embodiment, the HOP video frame slice group may change location and size within any given video frame presented at the MFPIP via the multimedia processing controller API and streaming media device driver. This delta HOP heat map may describe these changes as the user, for example, moves left, right, forward, or backwards during the video conferencing session. Similar to the data associated with the HOP heat map and its HOP video frame slice group, the data associated with the delta HOP heat map may be sent to the sink information handling systems before or concurrently with the video frames being sent. In an embodiment, the data associated with the delta HOP heat map may be sent using an OOB communication method over an OOB communication link. In an embodiment, the OOB communication link may be different from the communication link used by the information handling system to send the video frames to the sink information handling systems engaged in the video conferencing session.

The method 700 may continue with determining whether any additional video frames are to be processed at block 750. Where no other video frames are to be processed per the method 700 described herein, the process may end here. In an embodiment, where no more video frames are to be processed, this may be a result of a termination of the MMCA by the user thereby ending the video conference session. Where further video frames are to be processed, the method may continue at block 710 and the process may continue according to the method of FIG. 7 for additional video frame created for a videoconferencing session.

Figure 8:
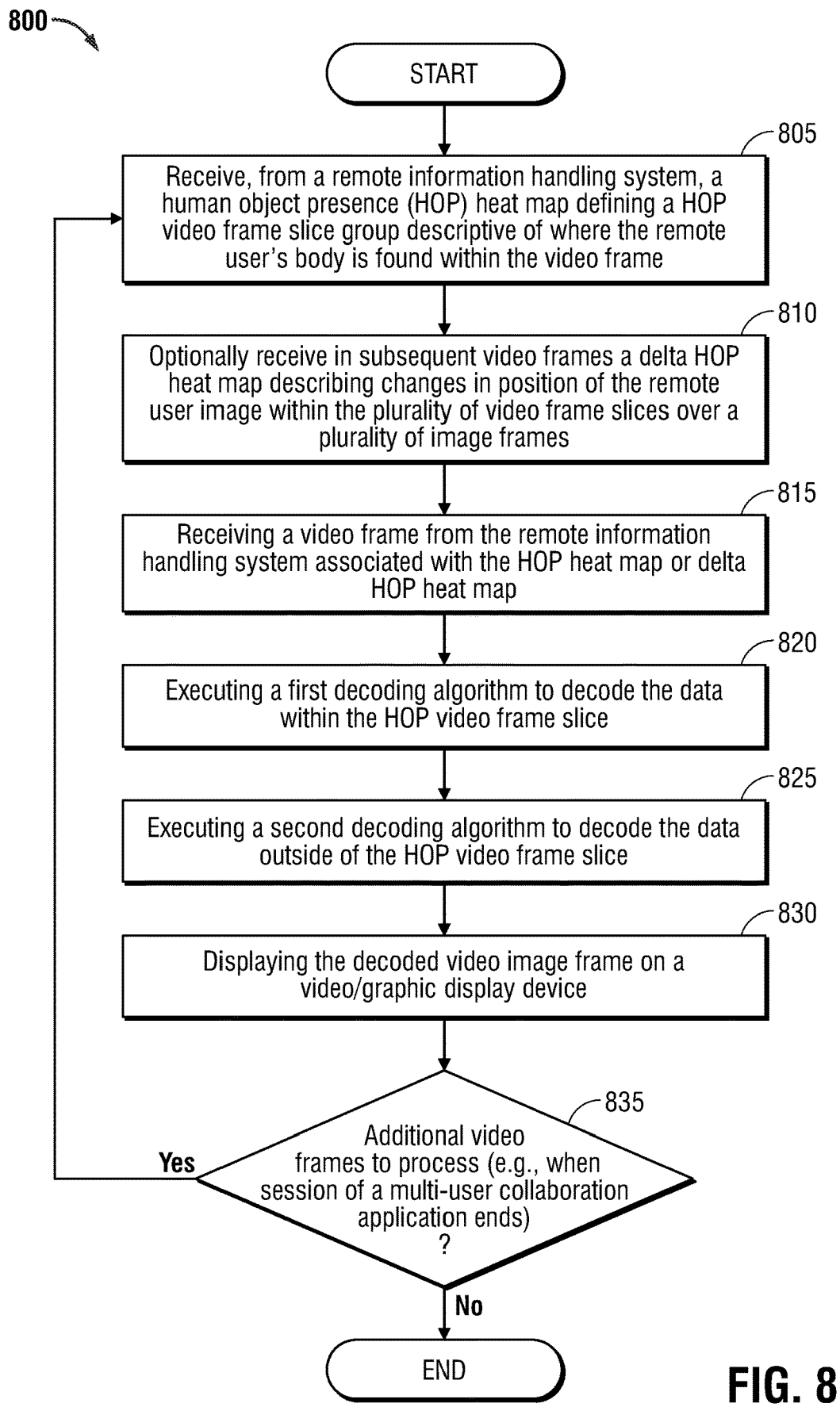
FIG. 8 is a flow diagram illustrating a method of reducing resource consumption at an information handling system during a video conferencing session according to another embodiment of the present disclosure.

FIG. 8 is a flow diagram illustrating a method 800 of reducing resource consumption at an information handling system during a video conferencing session according to an embodiment of the present disclosure. The method 800 may include receiving from a remote information handling system a human object presence (HOP) heat map defining a HOP video frame slice group descriptive of where the remote user's body is found within the video frame at block

805. As described herein, in order to properly decode the encoded video frame, the sink information handling system may be provided with data associated with the HOP heat map and its HOP video frame slice group created by the processor of the source information handling system. This data may include, among others, data describing the number of slices of the video frame, those slices that fall within the HOP video frame slice group, those slices the fell outside of the HOP video frame slice group (may be determined by default), the first encoding algorithm used by the source information handling system to encode the HOP video frame slice group, and the second encoding algorithm used by the source information handling system to encode the slices not present within the HOP video frame slice group. This allows the sink information handling system to properly decode the video frame as the stream of video frames is sent to the sink information handling systems from the information handling system. In an embodiment, the data associated with the HOP heat map and the HOP video frame slice group may be received using an OOB communication method over an OOB communication link, such as via an information handling system optimizer system. In an embodiment, the OOB communication link may be different from the communication link used by the sink information handling system to receive the video frames from the source information handling systems engaged in the video conferencing session. In some embodiments, the HOP heat map and HOP video frame slice group may be repeatedly generated at the source information handling system and transmitted to the sink information handling system.

In an alternative embodiment, the method 800 may also include, at block 810, receiving a delta HOP heat map describing changes in position of the remote user image within the plurality of video frame slices over a plurality of video frames. As described herein, the delta HOP heat map may describe changes in position of the human image within the plurality of video frame slices over a plurality of video frames captured by the video camera. In this embodiment, the HOP video frame slice group may change location and size within any given video frame presented at the MFPIP via the multimedia processing controller API and streaming media device driver. This delta HOP heat map may describe these changes as the user, for example, moves left, right, forward, or backwards during the video conferencing session. The delta HOP heat map and changes to the HOP video frame slice group will be provided in this embodiment for videoframes subsequent to a first video frame. The first video frame will be received from a source information handling system with a first videoframe HOP heat map and HOP video frame slice group for reference relative to later delta HOP heat map data. Similar to the data associated with the HOP heat map and its HOP video frame slice group, the data associated with the delta HOP heat map may be sent to the sink information handling systems before or concurrently with the video frames being sent. In an embodiment, the data associated with the delta HOP heat map may be received using an OOB communication method over an OOB communication link, such as via an information handling system optimizer system. In an embodiment, the OOB communication link may be different from the communication link used by the sink information handling system to receive the video frames from the source information handling systems engaged in the video conferencing session.

The method 800 may also include, at block 815, with receiving a video frame from the remote information handling system associated with the HOP heat map, such as during a videoconference session. Additionally, audio data may be received. In this embodiment, when the video frame is received, the encoding data associated with the indication of the HOP video frame slice group designated slices via the HOP heat map data or delta HOP heat map data may be applied as described herein. In an embodiment, the HOP heat map or delta HOP heat map data may be received prior to the information handling system receiving the video frame so that the information and algorithms used to decode the encoded video frame may be acquired and prepared for use. In other embodiments, the HOP heat map or delta HOP heat map data may be received concurrently with the video frames during a video conference. Additionally, indication of types of encoding algorithms to be applied may be received by the sink information handling system.

The method 800 may further include, at block 820, executing a first decoding algorithm to decode the data within the HOP video frame slice. As described herein, the HOP video frame slice group may be encoded using a first encoding algorithm and upon execution of the encoding processing instruction module by the AV processing instruction manager at the source information handling system. In this embodiment, the information handling system may be made aware of the first encoding algorithm used to encode the data associated within the HOP video frame slice group from communication from the source information handling system or MICA host server. With this, the sink information handling system may execute an appropriate first decoding algorithm to decode and decompress the video frame data within the HOP video frame slice group.

The method 800 further includes executing a second decoding algorithm to decode the data outside of the HOP video frame slice at 825. Again, as described herein, the slices outside of the HOP video frame slice group may be encoded using a second encoding algorithm having a lower computational burden than the first encoding algorithm at the source information handling system. In this embodiment, the sink information handling system may be made aware of the second encoding algorithm used to encode the data associated with the slices outside of the HOP video frame slice group from communication from the source information handling system or MICA host server. With this, the sink information handling system video processing engine may execute an appropriate second decoding algorithm to decode and decompress the video frame data from slices outside the HOP video frame slice group.

The method 800 may then display the decoded video frame on a video/graphic display device at block 830. Because the video frames are streaming, the decoding of any subsequent video frames per the method 800 described herein may be done repeatedly to present real-time video at the video/graphic display device to conduct the inbound AV data from one or more source information handling systems during a videoconference session. Additionally, an audio driver may receive inbound audio data for playback at a speaker at the sink information handling system.

The method 800 may continue with determining whether any additional video frames are to be processed at block 835. Where no other video frames are to be processed per the method 800 described herein, the process may end here. In an embodiment, where no more video frames are to be processed, this may be a result of a termination of the MMCA by the user thereby ending the video conference session. Where further video frames are to be processed, the method may continue at block 805 and the process may continue in this manner for plural video frames created during the videoconference session.

The blocks of the flow diagrams of FIGS. 7 and 8 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing a multimedia multi-user collaboration application (MMCA), comprising:
    a memory;
    a power management unit;
    a video camera to capture video of a user participating in a video conference session conducted by a processor executing code instructions of the MMCA via a first network link on a network interface device;
    a time-of-flight (TOF) sensor to provide distance data descriptive of the distance between a user's body and the video camera;
    the processor configured to execute a video frame user presence detection system to:
       slice a video frame into a plurality of video frame slices;
       based on the distance data, create a human object presence (HOP) heat map to assign a probability of the presence of the user's body within each video frame slice of the video frame;
    the processor configured to select, among the plurality of video frame slices, those video frame slices with an assigned probability of presence of the user's body that exceeds a threshold probability as a HOP video frame slice group where the user's body appears within the video frame; and
    the network interface device configured to send data defining the HOP video frame slice group to a sink information handling system participating in the video conference session over the network to assist decoding of the video frame at the sink information handling system.

2. The information handling system of claim 1 further comprising:
    the user presence detection system providing data descriptive of a delta HOP heat map descriptive of changes in position of the human image within the plurality of video frame slices over a plurality of subsequent video frames captured by the video camera; and
    the MMCA to send the data of the delta HOP heat map to the sink information handling system for decoding of the subsequent video frame.

3. The information handling system of claim 1 further comprising:
    the MMCA to detect the actuation of a virtual background; and
    data descriptive of the video frame slices where the user's body is found to execute a matting algorithm used to reduce a frame area of computation necessary to detect the outline of the user for use with the virtual background application.

4. The information handling system of claim 1 further comprising:
    the processor to execute a first encoding algorithm to encode the data within the HOP video frame slice group for transmission by the MMCA to the sink information handling system;
    the processor to execute a second encoding algorithm having a lower computational burden than the first encoding algorithm to encode data outside of the HOP video frame slice group for transmission by the MMCA to the sink information handling system;
    the MMCA sending data to the sink information handling system to define and use the first encoding algorithms to use on the video frame slices in the HOP video frame slice group and the second encoding algorithm designation for the video frame slices outside of the HOP video frame slice group.

5. The information handling system of claim 1 further comprising:
    the processor to execute an AV processing instruction manager to offload execution of the user presence detection system to an alternative processor in the information handling system.

6. The information handling system of claim 1, wherein the network interface device sends data defining the HOP video frame slice group to a sink information handling system for decoding of the video frame using an out-of-band (OOB) communication network link.

7. The information handling system of claim 1 further comprising:
    the processor configured to execute an unusual motion detection processing instruction module to calculate a delta HOP heat map descriptive of changes in position of the human image within the plurality of subsequent video frame slices over a plurality of video frames captured by the video camera after a first captured video frame by comparing historic HOP heat maps with a currently created HOP heat map.

8. The information handling system of claim 1 further comprising:
    the processor to execute a decoding processing instruction module to receive, from a remote information handling system, instructions describing how to decode a received video frame from the remote information handling system based on a HOP heat map produced at the remote information handling system.

9. A method of reducing resource consumption at an information handling system during a video conferencing session, comprising:
receiving, from a time-of-flight (TOF) sensor, distance data descriptive of the distance between a user's body and the video camera of the information handling system;
executing a multimedia multi-user collaboration application (MMCA) to establish the video conferencing session via a network interface device;
receiving, from the video camera, a video frame;
with a processor of the information handling system, executing a user presence detection system for:
slicing the video frame into a plurality of video frame slices;
based on the distance data, creating a human object presence (HOP) heat map assigning a probability of the presence of the user's body within each video frame slice of the video frame;
selecting, among the plurality of video frame slices, those video frame slices with an assigned probability of presence of the user's body appearing in the video frame slices that exceeds a threshold and probabilities; and
creating a HOP video frame slice group where the user's body is found within the video frame;
with a network interface device, sending data defining the HOP video frame slice group to a sink information handling system over the network for decoding of the video frame; and
with the network interface device, the MMCA to transmit encoded video frames for the video conference session.

10. The method of claim 9 further comprising:
executing the user presence detection system to provide data descriptive of a delta HOP heat map describing changes in position of the human image within the plurality of subsequent video frame slices over a plurality of subsequent video frames captured by the video camera after a first video frame; and
the MMCA to send the data of the delta HOP heat map to the sink information handling system over the network for decoding of the video frame.

11. The method of claim 9 further comprising:
with the execution of the MMCA, detecting the actuation of a virtual background and, with the data describing the HOP video frame slice group, providing the data descriptive of the video frame slices where the user's body is found to a processor executing a matting algorithm of an outline detection code used to reduce an area of computation to detect the outline of the user.

12. The method of claim 9 further comprising:
executing a first encoding algorithm to encode the data within the HOP video frame slice group for transmission by the MMCA to the sink information handling system;
executing a second encoding algorithm having lower computational requirements than the first encoding algorithm to encode data outside of the HOP video frame slice group for transmission by the MMCA to the sink information handling system; and
sending data to the sink information handling system defining which of the first and second encoding algorithms to use on the video frame slices of the HOP video frame slice group and the video frame slices outside of the HOP video frame slice group.

13. The method of claim 9 further comprising:
sending data defining the HOP video frame slice group to a sink information handling system over the network for decoding of the video frame using an out-of-band (OOB) communication on a network link separate from the encoded video frames.

14. The method of claim 9 further comprising:
executing an unusual motion detection processing instruction module to calculate a delta HOP heat map descriptive of changes in position of the human image within the plurality of video frame slices over a plurality of video frames captured by the video camera and comparing historic HOP heat maps with a currently created HOP heat map.

15. An information handling system executing a multimedia multi-user collaboration application (MMCA), comprising:
a memory;
a power management unit;
a processor executing code instruction of the MMCA to establish the video conference session via a network interface device;
a video camera to capture video of a user participating in a video conference session;
a time-of-flight (TOF) sensor to provide distance data descriptive of the distance between a user's body and the video camera;
the processor configured to execute a user presence detection system to:
slice a video frame into a plurality of video frame slices; and
based on the distance data, create a human object presence (HOP) heat map assigning a probability of the presence of the user's body appears within each video frame slice of the video frame; and
select, among the plurality of video frame slices, those video frame slices with an assigned probability of presence of the user's body that exceeds a threshold probability and create a HOP video frame slice group in which the user's body is found within the video frame;
the network interface device to send data defining the HOP video frame slice group to a sink information handling system participating in the video conference session over the network for decoding of the video frame; and
an unusual motion detection system configured to generate data descriptive of a delta HOP heat map descriptive of changes in position of the human image within the plurality of video frame slices over a plurality of video frames captured by the video camera and to send the data of the delta HOP heat map to the sink information handling system over the network for decoding of the streamed video frames.

16. The information handling system of claim 15 further comprising:
the processor executing the MMCA to detect the actuation of a virtual background; and
the processor executing a matting algorithm of a boundary detection processing instruction module with the data describing the HOP video frame slice group to reduce computation area of the video frame necessary to detect the outline of the user.

17. The information handling system of claim 15 further comprising:

the processor to execute a first encoding algorithm to encode the data within the HOP video frame slice group for transmission by the MMCA to the sink information handling system;

the processor to execute a second encoding algorithm having a lower computational burden than the first encoding algorithm to encode data outside of the HOP video frame slice group for transmission by the MMCA to the sink information handling system; and the MMCA sending data to the sink information handling system to use the first encoding algorithm on the video frame slices of the HOP video frame slice group and to use the second encoding algorithm on the video frame slices outside of the HOP video frame slice group.

18. The information handling system of claim 15 further comprising:

the network interface device to send data defining the HOP video frame slice group to a sink information handling system over the network for decoding of the video frame using an out-of-band (OOB) communication, the OOB communication sending the data defining the HOP video frame slice group on a different network link than used to send the encoded video frame.

19. The information handling system of claim 15 further comprising:

the processor to execute an AV processing instruction manager to offload execution of the user presence detection system to an alternative processor in the information handling system.

20. The information handling system of claim 15 further comprising:

a decoding processing instruction module to receive, from a remote information handling system, instructions describing how to decode a received video frame based on a HOP heat map produced at the remote information handling system.

* * * * *